United States Patent
Itoi

(10) Patent No.: US 10,351,688 B2
(45) Date of Patent: Jul. 16, 2019

(54) POLYETHYLENE RESIN FOAMED PARTICLES, POLYETHYLENE RESIN IN-MOLD FOAM-MOLDED ARTICLE, AND PRODUCTION METHODS THEREOF

(71) Applicant: Kaneka Corporation, Osaka (JP)

(72) Inventor: Akihiro Itoi, Osaka (JP)

(73) Assignee: KANEKA CORPORATION, Osaka (JP)

( * ) Notice: Subject to any disclaimer, the term of this patent is extended or adjusted under 35 U.S.C. 154(b) by 343 days.

(21) Appl. No.: 15/038,056

(22) PCT Filed: Nov. 19, 2014

(86) PCT No.: PCT/JP2014/080671
§ 371 (c)(1),
(2) Date: May 20, 2016

(87) PCT Pub. No.: WO2015/076306
PCT Pub. Date: May 28, 2015

(65) Prior Publication Data
US 2016/0304693 A1 Oct. 20, 2016

(30) Foreign Application Priority Data

Nov. 20, 2013 (JP) .................. 2013-240176
Jul. 2, 2014 (JP) .................. 2014-136454
Sep. 11, 2014 (JP) .................. 2014-184790

(51) Int. Cl.
| B29B 9/10 | (2006.01) |
| C08J 9/12 | (2006.01) |
| C08J 9/16 | (2006.01) |
| C08J 9/18 | (2006.01) |
| C08J 9/00 | (2006.01) |
| C08J 9/232 | (2006.01) |
| B29C 35/04 | (2006.01) |
| B29C 35/16 | (2006.01) |
| B29C 44/34 | (2006.01) |
| B29K 105/04 | (2006.01) |

(52) U.S. Cl.
CPC .................. *C08J 9/16* (2013.01); *B29B 9/10* (2013.01); *B29C 35/049* (2013.01); *B29C 35/16* (2013.01); *B29C 44/3461* (2013.01); *C08J 9/0061* (2013.01); *C08J 9/122* (2013.01); *C08J 9/18* (2013.01); *C08J 9/232* (2013.01); *B29C 2035/1616* (2013.01); *B29K 2023/06* (2013.01); *B29K 2105/048* (2013.01); *C08J 2201/034* (2013.01); *C08J 2203/06* (2013.01); *C08J 2205/052* (2013.01); *C08J 2323/04* (2013.01); *C08J 2323/06* (2013.01); *C08J 2423/04* (2013.01); *C08J 2423/06* (2013.01)

(58) Field of Classification Search
CPC ......... B29B 9/10; B29C 35/049; B29C 35/16; B29C 2035/1616; B29C 44/3461; C08J 9/0061; C08J 9/122; C08J 9/16; C08J 9/18; C08J 9/232; C08J 2201/034; C08J 2203/06; C08J 2205/052; C08J 2323/04; C08J 2323/06; C08J 2423/04; C08J 2423/06; B29K 2023/06; B29K 2023/0633; B29K 2023/065; B29K 2105/046; B29K 2105/048; B29K 2995/0092
See application file for complete search history.

(56) References Cited

U.S. PATENT DOCUMENTS

| 3,847,728 A * | 11/1974 | Hirata ..................... B32B 27/00 428/518 |
| 2012/0283344 A1* | 11/2012 | Nakayama ............. C08J 9/0023 521/56 |

FOREIGN PATENT DOCUMENTS

| JP | S59-187035 A | 10/1984 |
| JP | S62-15239 A | 1/1987 |
| JP | H06-157803 A | 6/1994 |
| JP | H06-316645 A | 11/1994 |
| JP | H07216153 A | 8/1995 |
| JP | H09-25356 A | 1/1997 |
| JP | 2000017079 A | 1/2000 |
| JP | 2004010648 A | 1/2004 |
| JP | 2010059393 A | 3/2010 |
| JP | 2011-201085 A | 10/2011 |
| WO | 2009075208 A1 | 6/2009 |
| WO | 2011086937 A1 | 7/2011 |

OTHER PUBLICATIONS

International Search Report issued in corresponding application No. PCT/JP2014/080671 dated Feb. 24, 2015 (4 pages).
Written Opinion of the International Searching Authority issued in corresponding application No. PCT/JP2014/080671 dated Feb. 24, 2015 (5 pages).

* cited by examiner

*Primary Examiner* — Irina S Zemel
(74) *Attorney, Agent, or Firm* — Osha Liang LLP

(57) ABSTRACT

Polyethylene resin foamed particles are obtained by foaming polyethylene resin particles containing a base resin. The base resin is a linear polyethylene resin. The polyethylene resin particles have a storage elastic modulus of 900 Pa or more and 5000 Pa or less at an angular frequency of 1 rad/second and a storage elastic modulus of 100000 Pa or less at an angular frequency of 100 rad/second, in a dynamic viscoelasticity measurement at 190° C. A differential scanning calorimetry (DSC) curve obtained by heating the polyethylene resin foamed particles using a differential scanning calorimeter at a temperature rising speed of 10° C./minute within a range of 20° C. to 220° C. has two melting peaks of a melting peak on a low temperature side and a melting peak on a high temperature side.

19 Claims, 1 Drawing Sheet

[Fig. 1]
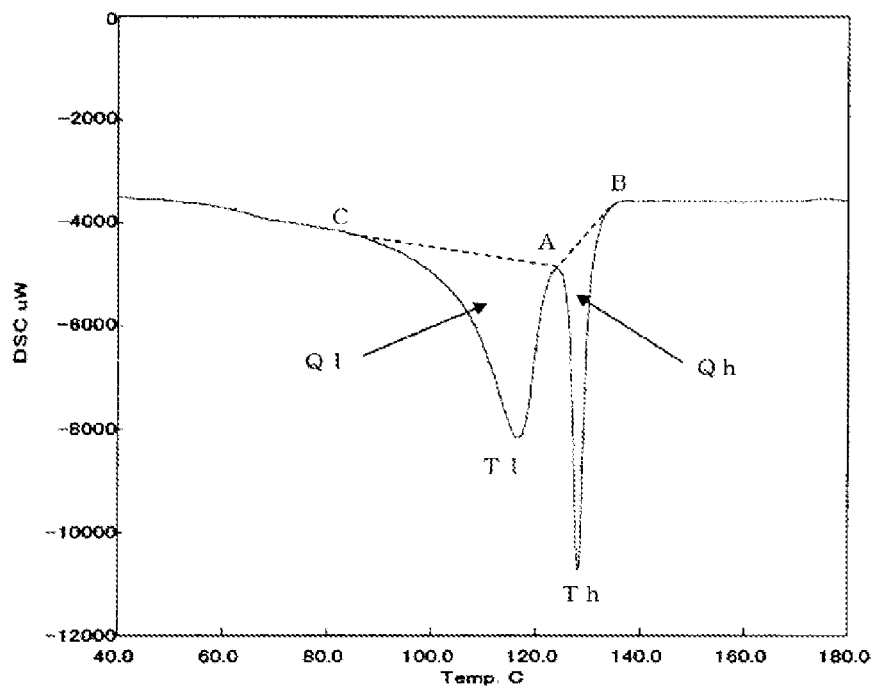
[Fig. 2]
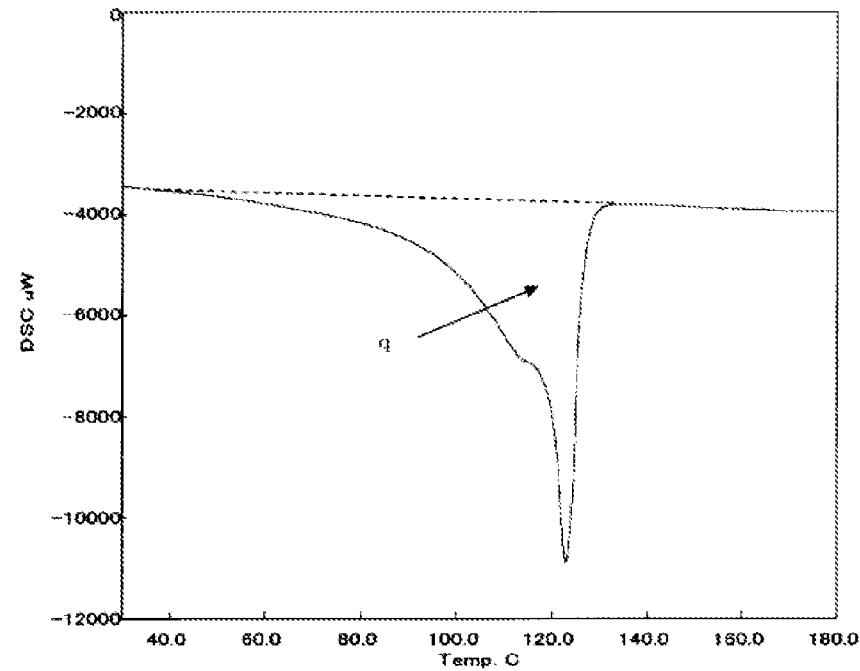

POLYETHYLENE RESIN FOAMED PARTICLES, POLYETHYLENE RESIN IN-MOLD FOAM-MOLDED ARTICLE, AND PRODUCTION METHODS THEREOF

TECHNICAL FIELD

The present invention relates to polyethylene resin foamed particles, and a polyethylene resin in-mold foam-molded article.

BACKGROUND

Polyethylene resin foam-molded articles are utilized in various uses as a cushioning packaging material or a thermally insulating material, because of their excellent flexibility and thermal insulation property.

For producing the polyethylene resin foam-molded article, an in-mold foam-molding method is known in which polyethylene resin particles are previously foam-molded (bead-foaming) with a foaming agent such as butane gas, the foamed particles are filled in a mold, and the particles are heat-fused by introducing a heat medium such as steam. In the bead-foaming of the polyethylene resin, a cross-linked polyethylene has been often used because a foamed body having a high expansion ratio and an excellent heat-resistance can be obtained therefrom. Even by using a non-cross-linked polyethylene resin having a good recyclability, it is proposed to produce a molded article having a good moldability (see Patent Documents 1 and 2).

Patent Documents 3 and 4 disclose inventions that a linear low-density polyethylene resin is subjected to a heat-treatment (annealing) to obtain a polyethylene resin having two endothermic peaks on a melting curve obtained by a differential scanning calorimetry (DSC), the peak difference thereof being set at a certain value or more, and that when the obtained polyethylene resin is used as a base resin, a mold-processing range of the obtained polyethylene resin foamed particles can be broadened.

The linear low-density polyethylene is a copolymer of ethylene with an α-olefin, and the larger the amount of the α-olefin which is a comonomer, the lower the melting temperature of the copolymer, and thus it is easily forms crystals having a low degree of crystallinity. For that reason, in order to broaden the peak difference on the melting curve by the heat-treatment, resins having a wide distribution of the comonomer amount are required.

According to Patent Document 4, it can be considered that the distribution of the comonomer amount is broadened by mixing polyethylene resins having a density different from each other.

On the other hand, Patent Document 3 discloses, as foamed particles using a polyethylene resin having a high rigidity, foamed particles using, as a base resin, a blended resin of a high-density polyethylene having a density of 0.940 g/cm$^3$ or more and a melt index (which may also be hereinafter referred to as "MI") of 0.01 to 0.5 g/10 minutes, and a linear low-density polyethylene resin having a density of 0.920 g/cm$^3$ or more and 0.940 g/cm$^3$ or less and an MI of 0.1 to 10 g/10 minutes. According to Patent Document 3, however, it is necessary to blend a large amount of the high-density polyethylene having a low MI and poor fluidity, and thus there is concern over the limitation of an amount of a resin processed and the decreased productivity due to the increased energy necessary for kneading and the increased pressure of an extruder, when resin particles, which are a starting material of foamed particles, are granulated.

Recently, the uniformity of a polymerization is increased with developments of polymerization catalysts, and it has been difficult to obtain a polyethylene resin having a broad comonomer amount distribution. In addition, when a polyethylene resin having a small amount of comonomers is used in order to improve a degree of crystallinity of a resin, a comonomer distribution in the resin is narrowed by decrease of an absolute quantity of the comonomers, and a peak difference on a DSC curve, obtained on a heat-treatment, is also narrowed. Thus, when it is intended to use a polyethylene resin having a high degree of crystallinity and a high rigidity to obtain foamed particles in order to improve a mechanical strength or to decrease a weight of a foam, the moldability is insufficient such that an open cell ratio in an in-mold foam-molded article is increased when a processing temperature is raised, and there is a defect of a narrow mold-processing range. There are some cases, accordingly, where the method in which the peak difference on the DSC curve is broadened in order to broaden the mold-processing range, as in Patent Documents 3 and 4, cannot be applied.

It has also become clear that foamed particles in which a high-density polyethylene is blended, as in Patent Document 3, cause some cases where the foamed particles are shrunk or the mold-processing range is narrowed, comparted to foamed particles having two endothermic peaks on a melting curve obtained by the differential scanning calorimetry and having a peak difference of a certain value or more.

In order to improve a mold-processability of foamed particles, Patent Documents 5 and 6 also disclose foamed particles using, as a base resin, a mixed resin of two or more kinds of polyethylene resins. According to these techniques, however, it is necessary to mix with a low-density polyethylene, produced by a high pressure method, having a low melting point and a low rigidity, and thus there is concern over the reduced heat-resistance and the reduced mechanical properties.

On the other hand, volatile organic foaming agents, as in Patent Documents 1 to 4, have hitherto been used as a foaming agent used in this field because foamed particles having a high expansion ratio can be obtained. With increased interest in environmental issues, however, inorganic gases such as carbon dioxide gas have recently been used as the foaming agent (see Patent Documents 7 and 8). For that reason, even if the same conventionally used resin is used, foamability and mold-processability may sometimes be different. For example, when the foaming agent is used, a ratio of open cells (hereinafter referred to as "open cell ratio") of a molded article is increased when a heating temperature is raised upon the mold-processing (in-mold foam-molding), and the appearance and physical properties of the molded article may sometimes be deteriorated.

CITATION LIST

Patent Literatures

Patent Document 1: JP-A No. S59-187035
Patent Document 2: JP-A No. S62-15239
Patent Document 3: JP-A No. H06-316645
Patent Document 4: JP-A No. H07-216153
Patent Document 5: JP-A No. H09-025356
Patent Document 6: JP-A No. H06-157803
Patent Document 7: JP-A No. 2000-17079
Patent Document 8: JP-A No. 2010-59393

SUMMARY OF INVENTION

One or more embodiments of the present invention provide polyethylene resin foamed particles capable of producing a polyethylene resin in-mold foam-molded article having a broad mold-processing temperature range, and good appearance and physical properties.

One or more embodiments of the present invention also provide polyethylene resin foamed particles which can be produced without impairing a productivity of resin particles which are a starting material for foamed particles, and which are capable of producing a polyethylene resin in-mold foam-molded article having a broad mold-processing temperature range, and good appearance and physical properties.

One or more embodiments of the present invention further provide, even if the foamed particles have a narrow peak temperature difference between temperatures of two melting peaks of a melting peak on a low temperature side and a melting peak on a high temperature side on a DSC curve obtained by a differential scanning calorimetry (DSC), polyethylene resin foamed particles which can be produced without impairing a productivity of resin particles, which are a starting material for foamed particles, and which are capable of obtaining a polyethylene resin in-mold foam-molded article having a little increased open cell ratio of a molded article and good appearance, even if a heating temperature is raised on mold-processing.

One or more embodiments of the present invention furthermore provide polyethylene resin foamed particles capable of producing a polyethylene resin in-mold foam-molded article which has a little increased open cell ratio thereof, and which has good appearance and physical properties, even if a heating temperature is raised on mold-processing.

The present inventors have found that when polyethylene resin foamed particles, obtained by foaming polyethylene resin particles having a storage elastic modulus of 900 Pa or more and 5000 Pa or less at an angular frequency of 1 rad/second and a storage elastic modulus of 100000 Pa or less at an angular frequency of 100 rad/second in a dynamic viscoelasticity measurement at 190° C., are used, then, even if a heating temperature is raised on mold-processing, an in-mold foam-molded article having a little increased open cell ratio thereof and having good appearance and dimensional stability can be obtained without impairing a productivity of the resin particles; that, even if polyethylene resin foamed particles have two melting peaks of a melting peak on a low temperature side and a melting peak on a high temperature side on a DSC curve obtained by a differential scanning calorimetry (DSC), and a peak temperature difference of 11° C. or lower, when polyethylene resin foamed particles, obtained by foaming polyethylene resin particles having a storage elastic modulus within the ranges described above at an angular frequency of 1 rad/second and a storage elastic modulus within the ranges described above at angular frequency of 100 rad/second in a dynamic viscoelasticity measurement at 190° C., are used, then an in-mold foam-molded article having a broad mold-processing range and good appearance can be obtained without impairing a productivity of the resin particles; and that when, as a base resin, a resin mixture is used in which (A") a linear low-density polyethylene resin having a density of 0.915 g/cm$^3$ or more and 0.940 g/cm$^3$ or less, and a melt index MI of 1.0 g/10 minutes or more and 10 g/10 minutes or less and (B") a high-density polyethylene resin having a density of 0.940 g/cm$^3$ or more and an MI of 0.01 g/10 minutes or more and 0.3 g/10 minutes or less are mixed in a specific ratio, the mixed polyethylene resin showing an MI within a specific range, and when the polyethylene resin foamed particles having two melting peaks on a melting curve obtained according to a differential scanning calorimetry (DSC) of the polyethylene resin foamed particles are used, then an in-mold foam-molded article having a little increased open cell ratio, and good appearance and physical properties can be obtained, even if a heating temperature is raised on mold-processing. On the basis of these findings, they have completed one or more embodiments of the present invention.

One or more embodiments of the present invention are as follows:

[1] Polyethylene resin foamed particles obtained by foaming polyethylene resin particles in which a linear polyethylene resin is a base resin,
wherein a storage elastic modulus is 900 Pa or more and 5000 Pa or less at an angular frequency of 1 rad/second and a storage elastic modulus is 100000 Pa or less at an angular frequency of 100 rad/second in a dynamic viscoelasticity measurement of the polyethylene resin particles at 190° C.; and
a DSC curve for the polyethylene resin foamed particles obtained by a differential scanning calorimetry (DSC) at a temperature rising speed of 10° C./minute within a range of 20° C. to 220° C. has two melting peaks of a melting peak on a low temperature side and a melting peak on a high temperature side.

[2] The polyethylene resin foamed particles according to [1], wherein the base resin is a mixed resin containing (A) a linear polyethylene resin having a melt index of 1.2 g/10 minutes or more and 10 g/10 minutes or less in a content of 60% by weight or more and 97% by weight or less, and (B) a linear polyethylene resin having a melt index of 0.01 g/10 minutes or more and 0.3 g/10 minutes or less in a content of 3% by weight or more and 40% by weight or less, the total of (A) and (B) being 100% by weight, and the polyethylene resin particles have a melt index of 0.8 g/10 minutes or more and 3.0 g/10 minutes or less.

[3] Polyethylene resin foamed particles in which a DSC curve obtained by a differential scanning calorimetry (DSC) at a temperature rising speed of 10° C./minute within a range of 20° C. to 220° C. has two melting peaks of a melting peak on a low temperature side and a melting peak on a high temperature side, a difference between respective temperatures at the two melting peaks being 11° C. or lower,
wherein the polyethylene resin foamed particles are obtained by foaming polyethylene resin particles having a storage elastic modulus of 900 Pa or more and 5000 Pa or less at an angular frequency of 1 rad/second, and a storage elastic modulus of 100000 Pa or less at an angular frequency of 100 rad/second in a dynamic viscoelasticity measurement at 190° C.

[4] The polyethylene resin foamed particles according to [3], wherein, when the temperature is raised at the temperature rising speed of 10° C./minute from 20° C. to 220° C. using a differential scanning calorimeter (DSC), lowered at a speed of 10° C./minute to 10° C., and raised again at the temperature rising speed of 10° C./minute up to 220° C., the resin particles has a crystal melting heat q of 145 J/g or more, the crystal melting heat q being calculated from a DSC curve obtained during the second temperature rising.

[5] The polyethylene resin foamed particles according to [3] or [4], wherein a base resin of the polyethylene resin particles is a mixed resin of (A') a polyethylene resin having a melt index of 1.2 g/10 minutes or more and 10 g/10 minutes or less in a content of 60% by weight or more and 97% by weight or less, and (B') a polyethylene resin having a melt index of 0.01 g/10 minutes or more and 0.3 g/10 minutes or less in a content of 3% by weight or more and 40% by weight or less, the total of (A') and (B') being 100% by weight, and the polyethylene resin particles have a melt index of 0.8 g/10 minutes or more and 3.0 g/10 minutes or less.

[6] Polyethylene resin foamed particles using, as a base resin, a polyethylene resin which is a resin mixture of (A'') a linear low-density polyethylene resin having a density of 0.915 g/cm$^3$ or more and less than 0.940 g/cm$^3$ and a melt index of 1.0 g/10 minutes or more and 10 g/10 minutes or less in a content of 50% by weight or more and 97% by weight or less, and (B'') a high-density polyethylene resin having a density of 0.940 g/cm$^3$ or more and a melt index of 0.01 g/10 minutes or more and 0.3 g/10 minutes or less in a content of 3% by weight or more and 50% by weight or less, the total of (A'') and (B'') being 100% by weight, and in which a melt index of the resin mixture is 0.8 g/10 minutes or more and 3.0 g/10 minutes or less, wherein a DSC curve obtained by a differential scanning calorimetry (DSC) of the polyethylene resin foamed particles has two melting peaks of a melting peak on a low temperature side and a melting peak on a high temperature side, and wherein a ratio (%) of a quantity of heat of the melting peak on a high temperature side to a total quantity of heat of the melting peaks on the DSC curve is 0.05 times or more and 0.4 times or less of a ratio (%) of the (A'') linear low-density polyethylene resin mixed in the base resin.

[7] The polyethylene resin foamed particles according to any one of [1] to [6], wherein a hydrophilic compound is contained in an amount of 0.01 parts by weight or more and 10 parts by weight or less based on 100 parts by weight of the base resin of the polyethylene resin particles.

[8] The polyethylene resin foamed particles according to any one of [1] to [7], wherein the foamed particles have an open cell ratio of 10% or less.

[9] A polyethylene resin in-mold foam-molded article obtained by filling any one of the polyethylene resin foamed particles according to any one of [1] to [8] in a mold, and then in-mold foam-molding them.

[10] A method for producing the polyethylene resin foamed particles according to any one of [1] to [8] comprising a first stage foaming step described below.

First stage foaming step: A step of producing polyethylene resin foamed particles comprising: dispersing polyethylene resin particles in an aqueous dispersion medium together with a foaming agent; heating them to a temperature equal to or higher than a softening temperature of the polyethylene resin particles and pressurizing them; and releasing them to an area having a pressure lower than an inner pressure of a sealed vessel.

[11] The method for producing the polyethylene resin foamed particles according to [10], wherein the foaming agent is an inorganic gas and/or water.

[12] The method for producing the polyethylene resin foamed particles according to [11], wherein the inorganic gas is carbon dioxide gas.

[13] A method for producing a polyethylene resin in-mold foam-molded article comprising: filling the polyethylene resin foamed particles according to any one of [1] to [8] in a molding space comprising two molds and capable of being closed but incapable of being sealed, without previously performing a pre-treatment; and heating them by a heating medium.

According to the polyethylene resin foamed particles of one or more embodiments of the present invention, an in-mold foam-molded article having a little increased open cell ratio in the molded article and having a good appearance can be obtained, even if a heating temperature is raised upon mold-processing.

Also, according to the polyethylene resin foamed particles of one or more embodiments of the present invention, foamed particles can be produced without impairing a productivity of resin particles which are a starting material of the foamed particles, and an in-mold foam-molded article having a little increased open cell ratio in the molded article and having a good appearance can be obtained even if a heating temperature is raised upon mold-processing.

Further, according to the polyethylene resin foamed particles of one or more embodiments of the present invention, even if the foamed particles have a narrow peak temperature difference between respective temperatures at a melting peak on a low temperature side and at a melting peak on a high temperature side on a DSC curve obtained by a differential scanning calorimetry (DSC), foamed particles can be produced without impairing a productivity of resin particles which are a starting material of the foamed particles, and an in-mold foam-molded article having a little increased open cell ratio in the molded article and having a good appearance can be obtained even if a heating temperature is raised upon mold-processing. Although it has been conventionally difficult to use a polyethylene resin having a high rigidity or the like as foamed particles because of its narrow width in a melting peak, such a resin can be used by adjusting storage elastic modulus values to the ranges defined herein.

BRIEF DESCRIPTION OF THE DRAWINGS

FIG. 1 is one example of a DSC curve obtained when a temperature of polyethylene resin foamed particles according to one or more embodiments of the present invention is raised at a speed of 10° C./minute from 20° C. to 220° C. by a differential scanning calorimeter (DSC) method, wherein Tl is a temperature of a melting peak on a low temperature side and Th is a temperature of a melting peak on a high temperature side on the DSC curve. In addition, A is a point at which an endothermic amount is the smallest between the two melting peaks of the melting peak on a low temperature side and the melting peak on a high temperature side on the DSC curve; and, when tangent lines are drawn from the point A to the DSC curve, and a tangent point on the high temperature side is defined as B, and a tangent point on the low temperature side is defined as C, a quantity of heat (Qh) of the melting peak on a high temperature side is a part surrounded by a line (A-B) and the DSC curve, and a quantity of heat (Ql) of the melting peak on a low temperature side is a part surrounded by a line (A-C) and the DSC curve.

FIG. 2 is one example of a DSC curve during a second temperature rising obtained when, using a differential scanning calorimeter (DSC) method, a temperature of the polyethylene resin particles of the present invention is raised at a temperature rising speed of 10° C./minute from 20° C. to 220° C., lowered at a speed of 10° C./minute to 10° C., and raised again at a temperature rising speed of 10° C./minute up to 220° C., wherein a crystal melting heat (q) is a part surrounded by a base line shown by a dotted line and the DSC curve.

DESCRIPTION OF EMBODIMENTS

One or more embodiments of polyethylene resin foamed particles disclosed herein may be exemplified by the following aspects.

[1] Polyethylene resin foamed particles, obtained by foaming polyethylene resin particles in which a linear polyethylene resin is a base resin, wherein a storage elastic modulus is 900 Pa or more and 5000 Pa or less at an angular frequency of 1 rad/second and a storage elastic modulus is 100000 Pa or less at an angular frequency of 100 rad/second in a dynamic viscoelasticity measurement of the polyethylene resin particles at 190° C.; and wherein a DSC curve for the polyethylene resin foamed particles obtained by a differential scanning calorimetry (DSC) at a temperature rising speed of 10° C./minute within a range of 20° C. to 220° C. has two melting peaks of a melting peak on a low temperature side and a melting peak on a high temperature side (hereinafter which may sometimes be referred to as "polyethylene resin foamed particles 1").

[2] Polyethylene resin foamed particles in which a DSC curve obtained by a differential scanning calorimetry (DSC) at a temperature rising speed of 10° C./minute within a range of 20° C. to 220° C. has two melting peaks of a melting peak on a low temperature side and a melting peak on a high temperature side, a difference between respective temperatures at the two melting peaks being 11° C. or lower, wherein the polyethylene resin foamed particles are obtained by foaming polyethylene resin particles having a storage elastic modulus of 900 Pa or more and 5000 Pa or less at an angular frequency of 1 rad/second, and a storage elastic modulus of 100000 Pa or less at an angular frequency of 100 rad/second in a dynamic viscoelasticity measurement at 190° C. (hereinafter which may sometimes be referred to as "polyethylene resin foamed particles 2").

[3] Polyethylene resin foamed particles using, as a base resin, a polyethylene resin which is a resin mixture of (A") a linear low-density polyethylene resin having a density of 0.915 g/cm$^3$ or more and less than 0.940 g/cm$^3$ and a melt index of 1.0 g/10 minutes or more and 10 g/10 minutes or less in a content of 50% by weight or more and 97% by weight or less, and (B") a high-density polyethylene resin having a density of 0.940 g/cm$^3$ or more and a melt index of 0.01 g/10 minutes or more and 0.3 g/10 minutes or less in a content of 3% by weight or more and 50% by weight or less, the total of (A") and (B") being 100% by weight, and in which a melt index of the resin mixture is 0.8 g/10 minutes or more and 3.0 g/10 minutes or less, wherein a DSC curve obtained by a differential scanning calorimetry (DSC) of the polyethylene resin foamed particles has two melting peaks of a melting peak on a low temperature side and a melting peak on a high temperature side, and wherein a ratio (%) of a quantity of heat of the melting peak on a high temperature side to a total quantity of heat of the melting peaks on the DSC curve is 0.05 times or more and 0.4 times or less of a ratio (%) of the (A") linear low-density polyethylene resin mixed in the base resin (hereinafter which may sometimes be referred to as "polyethylene resin foamed particles 3").

First, the polyethylene resin foamed particles 1 are explained.

The polyethylene resin foamed particles 1 uses a linear polyethylene resin as a base resin.

The linear polyethylene resin refers to a homopolymer obtained by polymerizing ethylene using a polymerization catalyst and the like, and copolymers of ethylene with a comonomer copolymerizable with ethylene (comonomer is a short chain branching), which may include high-density polyethylene, medium-density polyethylene, linear low-density polyethylene, mixed resins thereof, and the like.

As the comonomer copolymerizable with ethylene, α-olefins having 3 or more and 18 or less carbon atoms may be used. Examples thereof may include propene, 1-butene, 1-pentene, 1-hexene, 3,3-dimethyl-1-butene, 4-methyl-1-pentene, 4,4-dimethyl-1-pentene, 1-octene, and the like. They may be used alone or as a mixture of two or more kinds.

In the base resin described above, at least one resin selected from the group consisting of low-density polyethylene resins and cross-linked polyethylene resins may be blended with the linear polyethylene resin within a range in which uniformity of cells in the polyethylene resin foamed particles and mechanical properties of an obtained in-mold foam-molded article are not impaired.

When the polyethylene resin foamed particles are produced, polyethylene resin particles are produced first.

The polyethylene resin particles have a storage elastic modulus at an angular frequency of 1 rad/second of 900 Pa or more and 5000 Pa or less, such as 1100 Pa or more and 4000 Pa or less, or such as 1300 Pa or more and 3000 Pa or less, in the dynamic viscoelasticity measurement at 190° C. In the case that the storage elastic modulus at an angular frequency of 1 rad/second is less than 900 Pa in the dynamic viscoelasticity measurement at 190° C., the open cell ratio tends to be increased when the processing temperature is raised upon the in-mold foam-molding. In the case that it is more than 5000 Pa, it is difficult to expand the foamed particles upon the in-mold foam-molding and a surface beauty and the dimensional stability tend to be deteriorated.

The storage elastic modulus at an angular frequency of 100 rad/second is 100000 Pa or less, such as 95000 Pa or less, or such as 90000 Pa or less, in the dynamic viscoelasticity measurement at 190° C. In the case that the storage elastic modulus at an angular frequency of 100 rad/second is more than 100000 Pa in the dynamic viscoelasticity measurement at 190° C., a resin pressure upon extrusion and a torque value upon kneading tend to be increased when resin particles, which are a starting material of the foamed particles, are produced, and the productivity tends to be reduced because of mechanical limitations. Although there is no lower limit in the range of the storage elastic modulus at an angular frequency of 100 rad/second, in general, when the storage elastic modulus at 100 rad/second is decreased by decreasing a molecular weight or the like, the storage elastic modulus at 1 rad/second tends to be decreased. Accordingly, when the storage elastic modulus values are satisfied, the range thereof is automatically restricted.

In one or more embodiments of the present invention, the storage elastic modulus is measured by using a rotary rheometer, and after a flat plate resin sample is thoroughly pre-heated at 190° C., an angle of rotation is changed at a constant period, and a stress is detected when a strain is applied. A cone plate type is used as a measuring tool, and the measurement is performed in a nitrogen atmosphere. The measurement is performed in an angular frequency range of 0.1 rad/second to 100 rad/second, and a storage elastic modulus and a loss elastic modulus are obtained at each angular frequency. Of these results, the storage elastic modulus values at an angular frequency of 1 rad/second and at an angular frequency of 100 rad/second are adopted.

Method for obtaining polyethylene resin particles having a storage elastic modulus of 900 Pa or more and 5000 Pa or less at an angular frequency of 1 rad/second and having a storage elastic modulus of 100000 Pa or less at an angular frequency of 100 rad/second in the dynamic viscoelasticity measurement at 190° C., is not particularly limited, and may be exemplified by a method using, as the base resin, a mixed resin of a linear polyethylene resin (A) having a high melt index MI as a main component and a linear polyethylene resin (B) having a very low melt index MI.

The polyethylene resin particles above has a melt index MI at 190° C. of 0.8 g/10 minutes or more and 3.0 g/10 minutes or less, such as 1.0 g/10 minutes or more and 2.5 g/10 minutes or less. When the polyethylene resin particles have an MI of less than 0.8 g/10 minutes, the storage elastic modulus is high, the storage elastic modulus at an angular frequency of 100 rad/second is very likely to exceed 100000 Pa, and the fluidity is worsened, and thus it tends to be difficult to obtain an in-mold foam-molded article having good appearance. When the polyethylene resin particles have an MI of more than 3.0 g/10 minutes, the storage elastic modulus at an angular frequency of 1 rad/second is likely to be less than 900 Pa, and an open cell ratio of the in-mold foam-molded article tends to be increased.

In one or more embodiments of the present invention, the MI of the polyethylene resin particles is a value measured at a temperature of 190° C. with a load of 2.16 kg in accordance with JIS K 7210.

The polyethylene resin particles may have a density of 0.915 g/cm$^3$ or more and 0.940 g/cm$^3$ or less, such as 0.918 g/cm$^3$ or more and 0.935 g/cm$^3$ or less. When the polyethylene resin particles have a density of less than 0.915 g/cm$^3$, it is concerned that the rigidity of the resin is low and the mechanical properties thereof are reduced. When the polyethylene resin particles have a density of more than 0.940 g/cm$^3$, the resin may sometimes be brittle and it is concerned that the impact strength is reduced, and further the processing temperature range tends to be narrowed.

When a resin in which a linear polyethylene resin (A) having a high melt index MI as a main component is mixed with a linear polyethylene resin (B) having a very low melt index MI is used as the base resin of the polyethylene resin foamed particles 1, the linear polyethylene resin (A) having a high MI, which is the main component, has a melt index MI of 1.2 g/10 minutes or more and 10 g/10 minutes or less, such as 1.2 g/10 minutes or more and 6.0 g/10 minutes or less.

The linear polyethylene resin (B) having a very low melt index MI has a melt index MI of 0.01 g/10 minutes or more and 0.3 g/10 minutes or less, such as 0.02 g/10 minutes or more and 0.2 g/10 minutes or less.

With respect to a mixing ratio of the linear polyethylene resin (A) and the linear polyethylene resin (B) in the base resin of the polyethylene resin foamed particles 1, the linear polyethylene resin (A) may be contained in a content of 60% by weight or more and 97% by weight or less and the linear polyethylene resin (B) may be contained in a content of 3% by weight or more and 40% by weight or less, to 100% by weight of the total of (A) and (B); further the linear polyethylene resin (A) may be contained in a content of 70% by weight or more and 95% by weight or less and the linear polyethylene resin (B) may be contained in a content of 5% by weight or more and 30% by weight or less. When the linear polyethylene resins (A) and (B), which have an MI within the range described above, are mixed in the mixing ratio described above, the storage elastic modulus at an angular frequency of 1 rad/second tends to be 900 Pa or more and 5000 Pa or less, and the storage elastic modulus at an angular frequency of 100 rad/second tends to be 100000 Pa or less.

The linear polyethylene resin (A) may have a density of 0.915 g/cm$^3$ or more and 0.940 g/cm$^3$ or less, such as 0.918 g/cm$^3$ or more and 0.935 g/cm$^3$ or less. When the linear polyethylene resin (A) has a density of less than 0.915 g/cm$^3$, the rigidity of the base resin is low, and the reduction of the mechanical properties is concerned. When the linear polyethylene resin (A) has a density of more than 0.940 g/cm$^3$, the base resin may sometimes be brittle and it is concerned that the impact strength is reduced, and further the processing temperature range tends to be narrowed.

The linear polyethylene resin (B) may have a density of 0.915 g/cm$^3$ or more and 0.970 g/cm$^3$ or less, such as 0.920 g/cm$^3$ or more and 0.970 g/cm$^3$ or less. When the linear polyethylene resin (B) has a density of less than 0.915 g/cm$^3$, the rigidity of the base resin is low, and the reduction of the mechanical properties is concerned. When the linear polyethylene resin (B) has a density of more than 0.970 g/cm$^3$, the base resin may sometimes be brittle and it is concerned that the impact strength is reduced. In addition, it is difficult to melt the resin, and it is concerned that the kneading property is reduced when the resin particles are produced, and that the obtained foam has an ununiform cell structure and reduced physical properties.

Next, the polyethylene resin foamed particles 2 are explained.

With respect to polyethylene resin particles used in the production of the polyethylene resin foamed particles 2, the ranges of the storage elastic modulus at an angular frequency of 1 rad/second and an angular frequency of 100 rad/second in the dynamic viscoelasticity measurement at 190° C.

The polyethylene resin used in the production of the polyethylene resin foamed particles 2 may include high-density polyethylene resins, low-density polyethylene resins, linear low-density polyethylene resins, linear low-density polyethylenes having a long chain branching, and mixtures thereof. Of these polyethylene resins, as a main starting material, the linear low-density polyethylene resin, the linear low-density polyethylene having a long chain branching, the high-density polyethylene resin, or the mixture thereof may be used. In one or more embodiments of the present invention, the linear low-density polyethylene resin, the high-density polyethylene resin, or the mixture thereof may achieve the mechanical strength and the high foamability of the obtained polyethylene resin foamed particles.

The polyethylene resin used in the production of the polyethylene resin foamed particles 2 may contain a comonomer copolymerizable with ethylene in addition to ethylene. As the comonomer copolymerizable with ethylene, α-olefins having 3 or more and 18 or less carbon atoms may be used, and examples thereof may include propene, 1-butene, 1-pentene, 1-hexene, 3,3-dimethyl-1-butene, 4-methyl-1-pentene, 4,4-dimethyl-1-pentene, 1-octene, and the like. They may be used alone, or as a mixture of two or more kinds.

The polyethylene resin used in the production of the polyethylene resin foamed particles 2 may contain a polyethylene resin having a cross-linked structure and a long chain branching structure, within a range in which the processability and the recyclability are not affected.

The ranges of the melt index MI of the polyethylene resin particles are the same as those in the polyethylene resin foamed particles 1.

A method for obtaining the polyethylene resin particles having a storage elastic modulus of 900 Pa or more and 5000 Pa or less at an angular frequency of 1 rad/second and a storage elastic modulus of 100000 Pa or less at an angular frequency of 100 rad/second in the dynamic viscoelasticity measurement at 190° C. is not particularly limited, and may be exemplified a method using, as a base resin, a mixed resin of a polyethylene resin (A') having a high melt index as a main component with a polyethylene resin (B') having a very low melt index.

The polyethylene resin (A') may have a melt index of 1.2 g/10 minutes or more and 10 g/10 minutes or less, such as 1.2 g/10 minutes or more and 6.0 g/10 minutes or less. The polyethylene resin (B') may have a very low melt index has a melt index of 0.01 g/10 minutes or more and 0.3 g/10 minutes or less, such as 0.02 g/10 minutes or more and 0.2 g/10 minutes or less.

With respect to a mixing ratio of the polyethylene resin (A') and the polyethylene resin (B'), the polyethylene resin (A') may be contained in a content of 60% by weight or more and 97% by weight or less and the polyethylene resin (B') may be contained in a content of 3% by weight or more and 40% by weight or less, to 100% by weight of the total of (A') and (B'); in one or more embodiments the polyethylene resin (A') may be contained in a content of 70% by weight or more and 95% by weight or less and the polyethylene resin (B') may be contained in a content of 5% by weight or more and 30% by weight or less. When the polyethylene resins (A') and (B'), which have an MI within the range described above, are mixed in the mixing ratio described above, the storage elastic modulus at an angular frequency of 1 rad/second tends to be 900 Pa or more and 5000 Pa or less, and the storage elastic modulus at an angular frequency of 100 rad/second tends to be 100000 Pa or less.

The ranges of the density of the polyethylene resins (A') and (B') are the same as those in the polyethylene resins (A) and (B) in the polyethylene resin foamed particles 1.

The one or more embodiments of present invention also aims at obtaining foamed particles having a broad mold-processing range, such as foamed particles obtained from polyethylene resin particles having a high degree of crystallinity and a high rigidity, even if a polyethylene resin having a narrow melting temperature range is used as a starting material.

As one method for measuring an amount of crystals of a polyethylene resin, it is known that it can be calculated from a melting curve quantity of heat obtained by the differential scanning calorimeter (DSC). In the case of foamed particles obtained from polyethylene resin particles having a crystal melting heat (q in FIG. 2) calculated from a DSC curve during a second temperature rising obtained when, using a differential scanning calorimeter (DSC), a temperature is raised at a temperature rising speed of 10° C./minute from 20° C. to 220° C., lowered at a temperature falling speed of 10° C./minute to 10° C., and raised again at a temperature rising speed of 10° C./minute up to 220° C., is 145 J/g or more, the difference between the respective temperatures at the two melting peaks on the DSC curve of the foamed particles particularly tends to be narrow.

When the polyethylene resin (A') has a density of 0.930 g/cm$^3$ or more, the polyethylene resin particles tends to have a crystal melting heat q of 145 J/g or more.

The polyethylene resin particles may have a crystal melting heat q of 170 J/g or less. When the polyethylene resin has a crystal melting heat q of more than 170 J/g, the two melting peaks of the melting peak on a low temperature side and the melting peak on a high temperature side cannot be obtained on the DSC curve of the foamed particles, or the difference between the two melting peak temperatures is too narrow, and thus, the mold-processability may possibly worsened.

Next, the polyethylene resin foamed particles 3 are explained.

The polyethylene resin foamed particles 3 of one or more embodiments uses, as a base resin, a polyethylene resin in which (A") a linear low-density polyethylene resin having a density of 0.915 g/cm$^3$ or more and less than 0.940 g/cm$^3$ and a melt index of 1.0 g/10 minutes or more and 10 g/10 minutes or less in a content of 50% by weight or more and 97% by weight or less and (B") a high-density polyethylene resin having a density of 0.940 g/cm$^3$ or more and a melt index of 0.01 g/10 minutes or more and 0.3 g/10 minutes or less in a content of 3% by weight or more and 50% by weight or less are mixed, the total of (A") and (B") being 100% by weight, and in which a melt index of the mixture is 0.8 g/10 minutes or more and 3.0 g/10 minutes or less.

With respect to the mixing ratio of (A") the linear low-density polyethylene resin and (B") the high-density polyethylene resin, the (A") linear low-density polyethylene resin may be contained in a content of 70% by weight or more and 95% by weight or less, and the (B") high-density polyethylene resin may be contained in a content of 5% by weight or more and 30% by weight or less. When (A") the linear low-density polyethylene resin is contained in a content of less than 50% by weight, the minimum molding pressure capable of securing the fusionability upon the in-mold foam-molding is increased, thus resulting the increased processing temperature, and the in-mold foam-moldability tends to be worsened. When it is more than 97% by weight, it tends to easily make open cells, when the molding pressure (processing temperature) upon the in-mold foam-molding is increased.

The polyethylene resin mixture, which is used as the base resin, may have a melt index MI of 0.8 g/10 minutes or more and 3.0 g/10 minutes or less, such as 1.0 g/10 minutes or more and 2.5 g/10 minutes or less. When the polyethylene resin mixture has an MI of less than 0.8 g/10 minutes, the obtained foamed particles have a low expansion ratio because of the worsened fluidity, and it tends to be difficult to obtain an in-mold foam-molded article having good appearance. When the polyethylene resin mixture has an MI of more than 3.0 g/10 minutes, the foamed particles tend to be easily shrunk.

The (A") linear low-density polyethylene resin, used in the production of the polyethylene resin foamed particles 3, may have a density of 0.915 g/cm$^3$ or more and less than 0.940 g/cm$^3$, such as 0.918 g/cm$^3$ or more and 0.935 g/cm$^3$ or less. When the (A") linear low-density polyethylene resin has a density of less than 0.915 g/cm$^3$, it is concerned that the rigidity of the resin is low and the mechanical properties are reduced. When the (A") linear low-density polyethylene resin has a density of 0.940 g/cm$^3$ or more, the resin may sometimes be brittle and it is concerned that the impact strength is reduced, and further the processing temperature range tends to be narrowed.

The (A") linear low-density polyethylene resin, used in the production of the polyethylene resin foamed particles 3, may have a melt index MI of 1.0 g/10 minutes or more and 10 g/10 minutes or less, such as 1.5 g/10 minutes or more and 7.0 g/10 minutes or less. When the (A") linear low-density polyethylene resin has an MI of less than 1.0 g/10 minutes, there are tendencies in which the obtained foamed particle has a low ratio because of the worsened fluidity, and it is difficult to obtain an in-mold foam-molded article having good appearance. When the (A") linear low-density polyethylene resin has an MI of more than 10 g/10 minutes, the open cell ratios of the foamed particles and the in-mold foam-molded article tend to be increased.

As the (A") linear low-density polyethylene resin, used in the production of the polyethylene resin foamed particles 3, a blend of multiple linear low-density polyethylene resins having a different density may be used. In addition, a blend obtained by adding at least one resin selected from the group consisting of middle-density polyethylene resins and low-density polyethylene resins to the linear low-density polyethylene resin may be used, within a range in which the uniformity of the cells in the polyethylene resin foamed particle and the mechanical properties of the obtained in-mold foam-molded article are not impaired.

The (A") linear low-density polyethylene resin, used in the production of the polyethylene resin foamed particles 3, is a copolymer with a comonomer other than ethylene, which is copolymerizable with ethylene. As the comonomer copolymerizable with ethylene, α-olefins having 3 or more and 18 or less carbon atoms may be used, and examples thereof may include propene, 1-butene, 1-pentene, 1-hexene, 3,3-dimethyl-1-butene, 4-methyl-1-pentene, 4,4-dimethyl-1-pentene, 1-octene, and the like. They may be used alone or as a mixture of two or more kinds.

The (B") high-density polyethylene resin, used in the production of the polyethylene resin foamed particles 3, may have a density of 0.940 g/cm$^3$ or more, such as 0.945 g/cm$^3$ or more. When the (B") high-density polyethylene resin has a density of less than 0.940 g/cm$^3$, the amount of the comonomer is too much and it is difficult to increase the molecular weight, and thus it may sometimes be difficult to obtain a high-density polyethylene resin having a desired MI. Although the upper limit of the density of the (B") high-density polyethylene resin is not limited, the density of the high-density polyethylene resin depends on the degree of crystallinity, and thus even if the degree of crystallinity is increased, a value of about 0.970 g/cm$^3$ is a limit The (B") high-density polyethylene resin, used in the production of the polyethylene resin foamed particles 3, may have a melt index MI of 0.01 g/10 minutes or more and 0.3 g/10 minutes or less, such as 0.01 g/10 minutes or more and 0.1 g/10 minutes or less. When the (B") high-density polyethylene resin has an MI of less than 0.01 g/10 minutes, there are tendencies in which the obtained foamed particle has a low expansion ratio because of the worsened fluidity, and it is difficult to obtain an in-mold foam-molded article having good appearance. In the case that the (B") high-density polyethylene resin has an MI of more than 0.3 g/10 minutes, the open cell ratio tends to be increased when the processing temperature is raised upon the in-mold foam-molding.

As the (B") high-density polyethylene resin, used in the production of the polyethylene resin foamed particles 3, it is possible to use a blend of multiple high-density polyethylene resins having a different density. It is also possible to use a blend obtained by adding at least one resin selected from the group consisting of middle-density polyethylene resins and low-density polyethylene resins to the high-density polyethylene resin, within a range in which the uniformity of the cells in the polyethylene resin foamed particles and the mechanical properties of the obtained in-mold foam-molded article are not impaired.

The (B") high-density polyethylene resin, used in the polyethylene resin foamed particles 3, may contain a comonomer other than ethylene, which is copolymerizable with ethylene. As the comonomer copolymerizable with ethylene, α-olefins having 3 or more and 18 or less carbon atoms may be used, and examples thereof may include propene, 1-butene, 1-pentene, 1-hexene, 3,3-dimethyl-1-butene, 4-methyl-1-pentene, 4,4-dimethyl-1-pentene, 1-octene, and the like. They may be used alone or as a mixture of two or more kinds.

A method for producing the polyethylene resin particles 1 to 3 (hereinafter which are collectly referred to as "polyethylene resin foamed particles") may include, for example, a method described below.

First, polyethylene resins which are a starting material and additives (if necessary) are mixed in a dry-blending method, a masterbatch method, or the like.

Then, after the obtained mixture is melt-kneaded using an extruder, a kneader, a Banbury mixer(trademark), a roller, or the like, the kneaded product is shredded into particles using a cutter, a pelletizer, or the like thereby obtaining polyethylene resin particles.

In one or more embodiments of the present invention, the polyethylene resin particles may have a weight of 0.2 mg or more and 10 mg or less per particle, such as 0.5 mg or more and 6.0 mg or less per particle. When the polyethylene resin particles have a weight of less than 0.2 mg per particle, the obtained in-mold foam-molded article may possibly have an increased shrinkage percentage. When it is more than 10 mg, it may be difficult to fill the particles in a mold.

Here, the polyethylene resin particle weight per particle refers to an average resin particle weight obtained from 100 polyethylene resin particles, which are randomly selected. The polyethylene resin particle weight per particle is hardly changed even after the foaming step, and thus there is no problem even if the polyethylene resin particle weight per particle is considered as the polyethylene resin foamed particle weight per particle.

The polyethylene resin particles may contain, if necessary, a cell-nucleating agent, a hydrophilic compound, and additives such as an antioxidant, an anti-static agent, a coloring agent, and a flame retardant.

As the cell-nucleating agent used may be an inorganic nucleating agent such as talc, calcium stearate, calcium carbonate, silica, kaolin, titanium oxide, bentonite, or barium sulfate. They may be used alone or as a mixture of two or more kinds. The talc may be used as the cell-nucleating agents to obtain uniform cells.

In one or more embodiments, the hydrophilic compound may be added to the polyethylene resin particles. When the hydrophilic compound is added, the foamed particles having a high expansion ratio can be obtained, even if an inorganic gas is used as a foaming agent.

The hydrophilic compound used refers to a compound which contains a hydrophilic group such as a carboxylic group, a hydroxyl group, an amino group, a sulfo group, or a polyoxyethylene group in its molecule and a derivative thereof, including a hydrophilic polymer. Specifically, the compound containing a carboxyl group may include lauric acid and sodium laurate; and the compound containing a hydroxyl group may include ethylene glycol, glycerol, and the like. In addition, another hydrophilic organic compound may include organic compounds having a triazine ring such as melamine (Chemical name: 1,3,5-triazine-2,4,6-triamine), isocyanuric acid, and isocyanuric acid condensate. The hydrophilic compounds may be used alone or as a mixture of two or more kinds.

The hydrophilic polymer refers to a polymer having a moisture absorption ratio, measured in accordance with ASTM D 570, of 0.5% by weight or more, and may include generally called hygroscopic polymers, water-absorbing polymers which are not dissolved in water, absorb water in an amount of several times to several hundred times of the polymer, and are not easily dehydrated even if a pressure is applied thereto, and water-soluble polymers which are dissolved in water at an ordinary temperature to a high temperature.

Specific examples of the hydrophilic polymer may include:

ethylene-acrylic acid-maleic anhydride terpolymers;

ionomer resins in which carboxylic groups in an ethylene-(meth)acrylic acid copolymer are neutralized with an alkali metal ion such as a sodium ion or potassium ion or a transition metal ion such as a zinc ion to cause intermolecular cross-linking;

carboxyl group-containing polymers such as an ethylene-(meth)acrylic acid copolymer;

polyamides such as nylon-6, nylon-6,6, and copolymerized nylon;

nonionic water-absorbing polymers such as polyethylene glycol and polypropylene glycol;

polyether-polyolefin resin block copolymers exemplified by Pelestat (product name, manufactured by Sanyo Chemical Industries Ltd.);

cross-linked polyethylene oxide polymers exemplified by AQUA CALK (product name, manufactured by Sumitomo Seika Chemicals Co., Ltd.), and the like. The hydrophilic polymers may be used alone or as a mixture of two or more kinds.

Of these hydrophilic polymers, the nonionic water-absorbing polymer and the polyether-polyolefin resin block copolymer may be used because they have comparatively good dispersion stability in a pressure resistant vessel and exhibit the water-absorbability by a comparatively small amount of addition.

Of these hydrophilic compounds, glycerol, polyethylene glycol, propylene glycol, and melamine may be used because a foamed particle having a high expansion ratio can be easily obtained even if an inorganic gas is used as the foaming agent, and a foaming pressure for obtaining a foamed particle having a desired expansion ratio can be reduced, thus resulting in the reduced pressure resistance of facilities, which leads to cost reduction.

The polyethylene resin foamed particles may contain the hydrophilic compound in an amount of 0.01 parts by weight or more and 10 parts by weight or less, such as 0.03 parts by weight or more and 5 parts by weight or less, such as 0.05 parts by weight or more and 1 part by weight or less, based on 100 parts by weight of the polyethylene resin mixture (the base resin). When the hydrophilic compound is contained in an amount of less than 0.01 parts by weight, an effect of obtaining a foamed particle having a high expansion ratio does not tend to be obtained. When it is more than 10 parts by weight, it tends to be difficult to exhibit an effect of further improving the expansion ratio, and it is concerned that the surface beauty and the mechanical properties of the obtained in-mold foam-molded article are impaired.

Using the thus obtained polyethylene resin particles, the polyethylene resin foamed particles can be produced.

In one or more embodiments of the present invention, a method for producing the polyethylene resin foamed particles may include a method for producing the polyethylene resin foamed particles in an aqueous dispersion system in which the polyethylene resin particles are dispersed in an aqueous dispersion medium together with a foaming agent in a sealed vessel, the mixture is heated to a temperature equal to or higher than a softening temperature of the polyethylene resin particles and pressurized them, and then a foaming step is performed in which the polyethylene resin particles impregnated with the foaming agent are released into an area having a pressure lower than an inner pressure of a sealed vessel (in usual, the atmospheric pressure), thereby obtaining polyethylene resin foamed particles.

Specifically, for example, the polyethylene resin particles, an aqueous dispersion medium and, if necessary, a dispersing agent are filled in a sealed vessel; then, the sealed vessel is subjected to vacuum drawing, if necessary; after that, a foaming agent is introduced into the sealed vessel; and then the vessel is heated to a temperature equal to or higher than a softening temperature of the polyethylene resin. The addition amount of the foaming agent is adjusted so that the inner pressure of the sealed vessel is increased to about 1.5 MPa (gauge pressure) or more and 5 MPa or less (gauge pressure) by heating. After the heating, the foaming agent is further added to adjust the foaming pressure to a desired value if necessary, and then the content is held for longer than 0 minutes and equal to or shorter than 120 minutes, while the foaming temperature is finely adjusted, and then the content is released into an area having a pressure lower than an inner pressure of a sealed vessel (in usual, the atmospheric pressure), thereby obtaining the polyethylene resin foamed particles.

The temperature of the area to which the content is released may be adjusted to room temperature to about 110° C. for adjusting the expansion ratio. In order to obtain a foamed particle having a particularly high expansion ratio, it is desirable to adjust the temperature of the area to which the content is released to about 100° C. by using steam, or the like.

The method of introducing the foaming agent may be methods other than the method described above, and, for example, a method may be performed in which after the polyethylene resin particles, the aqueous dispersion medium and, if necessary, the dispersing agent are filled in the sealed vessel and then the sealed vessel is subjected to vacuum drawing if necessary, the foaming agent is introduced while the content is heated to a temperature equal to or higher than the softening temperature of the polyethylene resin.

As another introduction method of the foaming agent, a method may be performed in which the polyethylene resin particles, the aqueous dispersion medium and, if necessary, the dispersing agent are filled in the sealed vessel, and then the content is heated to a temperature close to the foaming temperature, and at this time the foaming agent is introduced.

As a method for adjusting the expansion ratio or the average cell diameter of the polyethylene resin foamed particles, for example, the expansion ratio or the average cell diameter can be adjusted by injecting carbon dioxide gas, nitrogen, air, a substance which is used as a foaming agent, or the like before the content is released to a low-pressure area to increase the inner pressure of the sealed vessel and adjust a pressure release speed upon foaming, and further by introducing the carbon dioxide gas, nitrogen, air, the substance which is used as the foaming agent, or the like into the sealed vessel during the release to the low-pressure area to control the pressure.

It may be possible to adjust the expansion ratio and the average cell diameter by appropriately changing the inner temperature of the sealed vessel before the release to the low-pressure area (approximately a foaming temperature). For example, the expansion ratio of the polyethylene resin foamed particles tends to be increased by increasing the inner pressure of the sealed vessel, increasing the pressure release speed, rising the inner temperature of the sealed vessel before the release, or the like. The average cell diameter of the polyethylene resin foamed particle tends to be decreased by increasing the inner pressure of the sealed vessel, increasing the pressure release speed, or the like.

The foaming agent used may include saturated hydrocarbons such as propane, butane, and pentane; ethers such as dimethyl ether; alcohols such as methanol and ethanol; inorganic gas such as air, nitrogen, and carbon dioxide gas; and water. The foaming agents may be used alone or as a mixture of multiple kinds. Of these foaming agents, carbon dioxide gas, nitrogen, air, or water may be used because of the small environmental burden and no danger of combustion, further carbon dioxide gas may achieve a foamed particle having a comparatively high expansion ratio can be easily obtained.

The polyethylene resin foamed particles show the two melting peaks of the melting peak on a low temperature side and the melting peak on a high temperature side on the DSC curve obtained by the differential scanning calorimetry (DSC). When the particles have the two melting peaks on the DSC curve, a foamed particle having a small shrinkage and the good in-mold foam-moldability can be obtained.

Here, the DSC curve obtained by the differential scanning calorimetry of the polyethylene resin foamed particles refers to a DSC curve obtained when 1 mg or more and 10 mg or less of the polyethylene resin foamed particles are heated at a temperature rising speed of 10° C./minute from 20° C. to 220° C. by using a differential scanning calorimeter.

The polyethylene resin foamed particles have the two melting peaks of the melting peak on a low temperature side and the melting peak on a high temperature side on the DSC curve, obtained by the differential scanning calorimetry (DSC), during a first temperature-rising period, and a peak temperature difference, which is a temperature difference between the temperature Tl at the melting peak on a low temperature side and the temperature Th at the melting peak on a high temperature side, may be 11° C. or lower (the peak temperature difference=Th–Tl, see FIG. 1). Further the particles having a peak temperature difference of 9° C. or lower can be applied. For that reason, a polyethylene resin having a high degree of crystallinity and a high rigidity can be used as the base resin. The peak temperature difference may be 5° C. or higher. When it is lower than 5° C., the moldability may possibly be worsened even if the polyethylene resin particles are used.

When the polyethylene resin particles impregnated with the foaming agent are held at a temperature at which a part of the crystals start to melt or higher for a given time in the foaming step of the polyethylene resin particles, the two melting peaks of the melting peak on a low temperature side and the melting peak on a high temperature side can be obtained on the DSC curve.

As shown in FIG. 1, a quantity of heat (Ql) of the melting peak on a low temperature side and a quantity of heat (Qh) of the melting peak on a high temperature side are defined as follows: When a point at which an endothermic amount is the smallest between the two melting points of the melting peak on a low temperature side and the melting peak on a high temperature side on the DSC curve is referred to as A, and when tangent lines are drawn from the point A to the DSC curve, a tangent point on the high temperature side is referred to as B and a tangent point on the low temperature side is referred to as C. In this situation, a part surrounded by a line AB and the DSC curve is referred to as a quantity of heat (Qh) of the melting peak on a high temperature side, and a part surrounded by a line AC and the DSC curve is referred to as a quantity of heat (Ql) of the melting peak on a low temperature side.

In the polyethylene resin foamed particles, a ratio of the quantity of heat (Qh) of the melting peak on a high temperature side to the total quantity of heat of melting peaks [=Qh/(Ql+Qh)×100 (hereinafter which may sometimes be referred to as "DSC ratio")] is not particularly limited, and it is appropriately adjusted depending on the property of the base resin. In general, foamed particles having a high expansion ratio can be more easily obtained as the DSC ratio is low, however, the obtained foamed particles and in-mold foam-molded article easily shrink, and the open cell ratio tends to be increased. When the DSC ratio is high, then foamed particles having a sufficient expansion ratio may not possibly be obtained, expandability is low on the in-mold foam-molding, and it tends to be difficult to obtain an in-mold foam-molded article having surface beauty.

The polyethylene resin foamed particles may have a DSC ratio of 4% or more and 50% or less, such as 7% or more and 35% or less. When the polyethylene resin foamed particles have a DSC ratio of less than 4%, the expandability of the polyethylene resin foamed particles is too high, and only foamed particles existing near to a mold surface (a part of a surface layer of the in-mold foam-molded article) are foamed to fuse the foamed particles to each other at the initial stage of the in-mold foam-molding; as a result, steam, which is used for the in-mold foam-molding, is not permeated into the inside of the foamed particle, and the obtained article tends to be an in-mold foam-molded article with poor fusion in which the inside of the in-mold foam-molded article is not fused. In addition, the open cell ratio of the molded article tends to be increased. On the contrary, when the polyethylene resin foamed particles have a DSC ratio of more than 50%, the expandability of the polyethylene resin foamed particles is too low, and there is a tendency that the whole of the in-mold foam-molded article is poor in the fusion or has the poor appearance, or a high molding pressure is necessary for the fusion.

The DSC curve in the polyethylene resin foamed particles depends on the property of the base resin, and it may be that the DSC ratio is 0.05 times or more and 0.4 times or less of the mixing ratio (%) of the polyethylene resins (A, A' and A") in the base resin. When the DSC ratio is within the range described above, the open cell ratio is low, and an in-mold foam-molded article having a good surface beauty can be easily obtained.

It is also possible to adjust the DSC ratio in the polyethylene resin foamed particles by appropriately changing the aforementioned temperature inside the sealed vessel (hereinafter which may sometimes be referred to as "foaming temperature") or the holding time before the release to the low pressure area, when the polyethylene resin foamed particles are obtained. The DSC ratio tends to be increased by lowering the temperature inside the sealed vessel (the foaming temperature), prolonging the holding time, or the like. On the contrary, the DSC ratio tends to be decreased by raising the temperature inside the sealed vessel (the foaming temperature), shortening the holding time, or the like. Further, when the foaming is performed in a state in which the crystals are completely melted by further rising the foaming temperature or the like, the melting peak on a high temperature side disappears, and the DSC curve of the foamed particles has one peak (i.e., Qh=0, and thus the DSC ratio is 0%).

The sealed vessel used is not particularly limited, and any vessel can be used so long as it can withstand a pressure inside the vessel and a temperature inside the vessel when the foamed particles are produced. Examples thereof may include an autoclave pressure resistant vessel.

The aqueous dispersion medium may be primarily water, however, a dispersion medium in which methanol, ethanol, ethylene glycol, or glycerol is added to water may be used.

In one or more embodiments of the present invention, when the hydrophilic compound is contained, water in the aqueous dispersion medium also acts as the foaming agent, and contributes to the improvement of the expansion ratio.

In the method for producing the polyethylene resin foamed particles in one or more embodiments of the present invention, a dispersing agent may be used in an aqueous dispersion medium in order to prevent cohesion of the polyethylene resin particles to each other.

The dispersing agent used may include inorganic dispersing agents such as tribasic calcium phosphate, tribasic magnesium phosphate, basic magnesium carbonate, calcium carbonate, barium sulfate, kaolin, talc, and clay. The dispersing agents may be used alone or as a mixture of two or more kinds.

In the method for producing the polyethylene resin foamed particles a dispersing aid may be used together with the dispersing agent.

Examples of the dispersing aid may include anionic surfactants such as carboxylate surfactants including an N-acylamino acid salt, an alkyl ether carboxylate, and acylated peptide;

sulfonate surfactants including an alkyl sulfonate, an n-paraffin sulfonate, an alkyl benzene sulfonate, an alkyl naphthalene sulfonate, and a sulfosuccinate;

sulfate surfactants including sulfated oil, an alkyl sulfate, an alkyl ether sulfate, an alkyl amide sulfate, and an alkyl allyl ether sulfate;

phosphate surfactants including an alkyl phosphate, a polyoxyethylene phosphate, and the like.

As the dispersing aid, it is possible to use polycarboxylic acid polymer surfactants such as a maleic acid copolymer salt and a polyacrylate; and polyvalent anionic polymer surfactants such as a polystyrene sulfonate, and a formalin condensate salt with naphthalenesulfonic acid. The dispersing aids may be used alone or as a mixture of two or more kinds.

Of these, at least one compound may be selected from the group consisting of tribasic calcium phosphate, tribasic magnesium phosphate, barium sulfate, and kaolin as the dispersing agent together with at least one compound selected from the group consisting of sodium n-paraffin sulfonate and alkyl benzene sulfonic acid as the dispersing aid.

The amount of the dispersing agent or the dispersing aid used varies depending on the kind thereof, and the kind and amount of the polyethylene resin particles used, and in usual, the dispersing agent may be in an amount of 0.1 parts by weight or more and 3 parts by weight or less and the dispersing aid in an amount of 0.001 parts by weight or more and 0.1 parts by weight or less, based on 100 parts by weight of the aqueous dispersion medium. In order to improve the dispersibility of the polyethylene resin particles in the aqueous dispersion medium, the polyethylene resin particles may be in an amount of 20 parts by weight or more and 100 parts by weight or less, based on 100 parts by weight of the aqueous dispersion medium.

In addition to the method for producing the polyethylene resin foamed particles in the aqueous dispersion system described above, it is also possible to obtain the polyethylene resin foamed particles by bringing the polyethylene resin particles into direct contact with the foaming agent in the sealed vessel, without using the aqueous dispersion medium, to impregnate the particles with the foaming agent and to obtain foamable polyethylene resin particles, and then bringing the foamable polyethylene resin particles into contact with steam to foam them.

A step in which the polyethylene resin foamed particles are obtained from the polyethylene resin particles, as described above, may sometimes be referred to as "first stage foaming step" and the thus obtained polyethylene resin foamed particles may sometimes be referred to as "first stage foamed particles."

When the first stage foamed particles are further impregnated with inorganic gas (for example, air, nitrogen, carbon dioxide gas, or the like) to provide an inner pressure to them, and then the particles are brought into contact with steam having a specific pressure, the polyethylene resin foamed particles having an expansion ratio which is higher than that of the first stage foamed particles can be obtained. A step in which the polyethylene resin foamed particles are further foamed to provide polyethylene resin foamed particles having a higher expansion ratio, as described above, may sometimes be referred to as "second stage foaming step" and polyethylene resin foamed particles obtained through the second stage foaming step may sometimes be referred to as "second stage foamed particles."

The "second stage foaming step" refers specifically to a step in which the first stage foamed particles are impregnated with the inorganic gas (for example, air, nitrogen, carbon dioxide gas, and the like) to provide the inner pressure to them, and then the resulting particles are brought into contact with steam having a specific pressure to obtain second stage foamed particles having an expansion ratio which is higher than that of the first stage foamed particles.

Here, the steam pressure in the second stage foaming step is adjusted to a range of 0.02 MPa (gauge pressure) or more and 0.15 MPa (gauge pressure) or less, such as 0.03 MPa (gauge pressure) or more and 0.1 MPa (gauge pressure) or less, considering the expansion ratio of the second stage foamed particles.

It is desirable that the inner pressure of the inorganic gas with which the first stage foamed particles are impregnated is appropriately changed considering the expansion ratio and the like of the second stage foamed particles, such as between 0.12 MPa or more (absolute pressure) and 0.6 MPa or less (absolute pressure).

The expansion ratio of the polyethylene resin foamed particles is not particularly limited, and may be adjusted as necessary. The expansion ratio of the polyethylene resin foamed particles may be 2 times or more and 50 times or less, such as 8 times or more and 45 times or less, or may be 11 times or more and 40 times or less, in terms of the weight reduction and the mechanical properties of the polyethylene resin in-mold foam-molded article. When the expansion ratio of the polyethylene resin foamed particles is less than 2 times, the effect of the weight reduction is small, and when it is more than 50 times, the mechanical properties such as a compressive stress of the polyethylene resin in-mold foam-molded article tend to be decreased.

Here, the expansion ratio of the polyethylene resin foamed particles refers to a value calculated as a ratio ($\rho r/\rho b$) of true specific gravities before and after the foaming, wherein the $\rho r$ and the $\rho b$ are obtained in a manner in which a weight wb (g) of the polyethylene resin foamed particles and a weight wr (g) of the polyethylene resin particles before the foaming are measured; then they are each sunk in ethanol in a measuring cylinder; volumes vb and vr (cm$^3$) are measured by reading a liquid level rising in the measuring cylinder (a submersion method); and a true specific gravity $\rho b$ of the polyethylene resin foamed particles (=wb/vb) and a true specific gravity $\rho r$ of the polyethylene resin particles (=wr/vr) are calculated.

The polyethylene resin foamed particles may have an average cell diameter of 80 μm or more and 500 μm or less, such as 120 μm or more and 400 μm or less. When the polyethylene resin foamed particles have an average cell diameter of less than 80 μm, the obtained polyethylene resin in-mold foam-molded article tends to be greatly shrunk, and when it is more than 500 μm, the appearance of the obtained polyethylene resin in-mold foam-molded article tends to be worsened.

Here, the average cell diameter is measured as follows:

In an image obtained by an observation with a microscope of a cross-section at a center of the foamed particle, a straight line, passing through the almost center of the foamed particle, is drawn and the number n of cells through which the straight line is passed and a foamed particle diameter L (μm), decided by an intersection point of the straight line and the foamed particle surface, are read. The average cell diameter is obtained by the formula (1):

$$\text{Average Cell Diameter (μm)} = L \div n \quad (1)$$

The polyethylene resin foamed particles may have an open cell ratio of 10% or less, such as 5% or less. When the polyethylene resin foamed particles have an open cell ratio of more than 10%, shrinkage is caused upon the in-mold foam-molding, and the surface property of the obtained polyethylene resin in-mold foam-molded article tends to be reduced and the compressive strength also tends to be reduced.

Here, the open cell ratio of the polyethylene resin foamed particles is a value obtained as follows: A volume Vc (cm$^3$) of the polyethylene resin foamed particles is measured using an air-comparison pycnometer according to a method described in ASTM D 2856-87 PROCEDURE C; then the total amount of the polyethylene resin foamed particles after the Vc measurement is sunk in ethanol in a measuring cylinder, and an apparent volume Va (cm$^3$) of the polyethylene resin foamed particles is obtained by reading a liquid level rising in the measuring cylinder (a submersion method); and the open cell ratio is calculated by the following formula:

$$\text{Open Cell Ratio (\%)} = (Va - Vc) \div Va \times 100$$

The polyethylene resin foamed particle obtained as above are subjected to an in-mold foam-molding in which the particles are filled in a mold having a pre-determined shape and are heated with steam or the like to fuse the foamed particles to each other, whereby a polyethylene resin in-mold foam-molded article can be obtained.

As a method of in-mold foam-molding, for example, the following methods can be utilized.

(a) a method in which the polyethylene resin foamed particles are subjected to a pressurization treatment with inorganic gas (for example, air, nitrogen, carbon dioxide gas, or the like) to impregnate the polyethylene resin foamed particles with the inorganic gas; a pre-determined inner pressure is applied to the polyethylene resin foamed particles; they are filled in a mold; and they are heat-fused with steam.

(b) a method in which the polyethylene resin foamed particles are compressed with a gas pressure and filled in a mold, and they are heat-fused with steam utilizing the restoring force of the polyethylene resin foamed particles.

(c) a method in which, without performing a specific pre-treatment, the polyethylene resin foamed particles are filled in a mold, and they are heat-fused with steam.

In one or more embodiments of the present invention, the method (c) may be used, because a molded article having a beautiful appearance and a small dimensional shrinkage percentage to mold can be obtained even if the method (c) is used.

A specific method of in-mold foam-molding a polyethylene resin in-mold foam-molded article from the polyethylene resin foamed particles may include, for example, a method in which the polyethylene resin foamed particles, which has not been previously subjected to a pre-treatment, are filled in a molding space formed of two molds and capable of being closed but incapable of being sealed, and molded at a heating steam pressure of about 0.05 to 0.20 MPa (gauge pressure) for a heating time of about 3 to 30 seconds using a heating medium such as steam to fuse the polyethylene resin foamed particles to each other, the mold is cooled with water and then opened, thereby obtaining a polyethylene resin in-mold foam-molded article.

EXAMPLE

Next, the polyethylene resin foamed particles and the production method thereof are explained in detail referring to Examples and Comparative Examples. However, the present invention is not limited thereto.

Substances used in Examples and Comparative Examples are shown below. They were used without purification or the like.

Glycerol [Purified Glycerol D manufactured by Lion Corporation)]

Powdery Basic Tribasic Calcium Phosphate [manufactured by Taihei Chemical Industrial Co., Ltd.]

Sodium Alkylsufonate (sodium n-paraffin sulfonate [LATEMUL PS manufactured by Kao Corporation])

Polyethylene resins used in Examples and Comparative Examples were purchased from polyolefin makers [SK Chemicals Co., Ltd., Japan Polyethylene Corporation, The Dow Chemical Company, Prime Polymer Co., Ltd., Ube-Maruzen Polyethylene Co., Ltd., and the like]. Physical properties of each polyethylene resin are shown in Table 1.

TABLE 1

| Polyethylene resin | | (A-1) | (A-2) | (A-3) | (A-4) | (A-5) | (A-6) | (A-7) | (A-8) | (B-1) | (B-2) |
|---|---|---|---|---|---|---|---|---|---|---|---|
| Density | g/cm$^3$ | 0.919 | 0.926 | 0.931 | 0.919 | 0.935 | 0.931 | 0.926 | 0.930 | 0.952 | 0.956 |
| MI | g/10 min | 2.8 | 2.1 | 4.0 | 6.0 | 2.5 | 2.1 | 1.0 | 1.0 | 0.04 | 0.2 |
| Melting point | ° C. | 123 | 123 | 123 | 120 | 125 | 124 | 123 | 123 | 131 | 133 |

Evaluation methods performed in Examples and Comparative Examples are explained.

<Resin Pressure on Production of Resin Particles>

In "Production of Polyethylene Resin Particles," a resin pressure of a part before a die, displayed on an extruder, was read and evaluations were performed according to the following criteria:

○: A resin pressure of 7.5 MPa or less

Δ: A resin pressure of more than 7.5 MPa and 8.0 MPa or less x: A resin pressure of more than 8.0 MPa <Measurement of Storage Elastic Modulus of Resin Particles>

A flat plate-like space of 100 mm (length)×100 mm (width) was formed using spacers having a thickness of 1.0 mm in a press machine [37 TS Molding Machine manufactured by Fuji Setsubi Kogyo Kabushiki Kaisha], which had been previously pre-heated at 190° C., and polyethylene resin particles were hot pressed with a pressure of 56 kg/cm² (5.5 MPa) for 5 minutes. After that, the resin particles were cooled in the pressed state until the temperature reached 50° C. and then the spacers were taken away to obtain a polyethylene resin plate having a length of about 100 mm, a width of about 100 mm and a thickness of about 1 mm. The obtained polyethylene resin plate was punched using a punch having a diameter of $\phi$ 25 mm to obtain test pieces.

As a measurement apparatus, a viscoelasticity measuring apparatus, ARES, manufactured by TA Instruments Inc., was used, with which a cone plate-type tool having a diameter of 25 mm and a cone angle of 0.04 rad was loaded. A thermostatic chamber was set so that it enclosed the tool, the tool is kept at 190° C., the thermostatic chamber was opened after the tool was pre-heated, a test piece was inserted into parallel plates, the thermostatic chamber was closed, it was pre-heated for 5 minutes, and compression was performed until a space between the cone plates reached 0.07 mm as described in a calibration certificate. After the compression, the thermostatic chamber was opened again, the resin protruding from the cone plates was scraped up by a brass spatula, the thermostatic chamber was closed, it was kept hot for 5 minutes again, and then the dynamic viscoelasticity measurement was started.

The measurement was performed in a range of an angular frequency of 0.1 rad/second to 100 rad/second, and a storage elastic modulus and a loss elastic modulus were obtained at each angular frequency. Of the obtained results, values of the storage elastic modulus at angular frequencies of 1 rad/second and 100 rad/second were adopted. The strain amount was 5% and the measurement was performed in a nitrogen atmosphere.

<Measurement of Crystal Melting Heat of Resin Particles>

Using a differential scanning calorimeter [DSC6200 manufactured by Seiko Instruments Inc.], the temperature of 5 to 6 mg of the obtained polyethylene resin particles was raised at a temperature rising speed of 10° C./minute from 20° C. to 220° C., lowered at a speed of 10° C./minute to 10° C., and then raised again at a temperature rising speed of 10° C./minute to 220° C., thereby obtaining a DSC curve on a second temperature rising (an example thereof is shown in FIG. 2). A total quantity of heat (q) of the endothermic peaks on the obtained DSC curve was referred to as a crystal melting heat of the resin particles.

<Measurement of MI of Resin Particles>

An MI of the polyethylene resin particles was measured using an MI measuring instrument described in JIS K 7210, under conditions of an orifice diameter of 2.0959±0.005 mm$\phi$, an orifice length of 8.000±0.025 mm, a load of 2160 g, and a temperature of 190±0.2° C.

<Shrinkage of Foamed Particles>

The obtained polyethylene resin first stage foamed particles were observed and the evaluation was performed by the following criteria:

○: There are almost no wrinkles on the surface of first stage foamed particles.

Δ: There are a few wrinkles on the surface of first stage foamed particles.

x: The surface of first stage foamed particles is wrinkled, and the particles are clearly shrunk.

<Measurement of Expansion Ratio>

A weight wb (g) of the obtained polyethylene resin foamed particles and a weight wr (g) of polyethylene resin particles before the foaming were measured; and then they were each sunk in ethanol in a measuring cylinder, and volumes vb and vr (cm³) were measured by reading a liquid level rising in the measuring cylinder (a submersion method); and a true specific gravity ρb of the polyethylene resin foamed particles (=wb/vb) and a true specific gravity ρr of the polyethylene resin particles (=wr/vr) were calculated. The expansion ratio was calculated as a true specific gravity ratio (ρr/ρb) of the true specific gravities before and after the foaming <Measurement of Average Cell Diameter of Foamed Particles>

The obtained polyethylene resin second stage foamed particles were cut at the center of the foamed particle using a double blade razor ["Hi Stainless" double blade manufactured by Feather Safety Razor Co., Ltd.].

In an image of the cross-section thereof obtained by an observation with an optical microscope ["VHX-100" manufactured by Keyence Corporation] at a magnification of 50, a straight line, passing through the almost center of the foamed particle, was drawn; and the number n of cells through which the straight line was passed and a foamed particle diameter L (μm), decided by an intersection point of the straight line and the foamed particle surface, were read. The average cell diameter is obtained by the formula (1):

$$\text{Average Cell Diameter (μm)} = L \div n \qquad (1)$$

<Melting Peak Temperature Difference and DSC Ratio of Foamed Particles>

A DSC curve was obtained when the temperature of 5 to 6 mg of the obtained polyethylene resin first stage foamed particles was raised at a temperature rising speed of 10° C./minute from 20° C. to 220° C., using a differential scanning calorimeter [DSC 6200 manufactured by Seiko Instruments Inc.] (an example thereof is shown in FIG. 1).

A temperature difference (Th−Tl) between a temperature (Tl) at the melting peak on a low temperature side and a temperature (Th) at the melting peak on a high temperature side on the obtained DSC curve was referred to as a melting peak temperature difference.

A DSC ratio was calculated from the quantity of heat Ql of the melting peak on the low temperature side and the quantity of heat Qh of the melting peak on the high temperature side, according to the following formula:

$$\text{DSC Ratio} = Qh \div (Ql + Qh) \times 100$$

<Open Cell Ratio of Foamed Particles>

A volume Vc (cm³) of the obtained polyethylene resin second stage foamed particles was measured using an air-comparison pycnometer [Model 1000 manufactured by Tokyoscience Co., Ltd.] according to a method described in ASTM D 2856-87 PROCEDURE C.

Next, the total amount of the polyethylene resin foamed particles after the Vc measurement was sunk in ethanol in a measuring cylinder, and an apparent volume Va (cm³) of the polyethylene resin foamed particles was obtained by reading a liquid level rising in the measuring cylinder (a submersion method).

The open cell ratio was calculated by the following formula:

$$\text{Open Cell Ratio (\%)} = (Va - Vc) \div Va \times 100$$

<Minimum Molding Pressure on Molding>

With respect to the each foam-molded article to be evaluated which is obtained by molding the particles in a manner in which a pre-determined steam pressure was changed 0.01 MPa by 0.01 MPa within a range of 0.10 to 0.18 MPa (gauge pressure) in the main heating step in [Production of Polyethylene Resin In-Mold Foam-Molded Article], a crack having a depth of about 5 mm was made in the surface of the in-mold foam-molded article with a knife, the article was fractured along with the crack, the fracture surface was observed, a ratio of the number of fractured particles to the number of total particles on the fracture surface was obtained, and a fusion ratio of the molded article was evaluated.

The minimum steam pressure at which the fusion ratio reached 80% or more was referred to as the minimum molding pressure.

<Maximum Molding Pressure on Molding>

From the center of each foam-molded article to be evaluated which is obtained by molding the particles in a manner in which a pre-determined steam pressure was changed 0.01 MPa by 0.01 MPa within a range of 0.10 to 0.18 MPa (gauge pressure) in the main heating step in [Production of Polyethylene Resin In-Mold Foam-Molded Article], a piece having sizes of about 25 mm×25 mm×30 mm was cut down, which was used as a foam sample for measurement.

A volume vc (cm$^3$) of the foam sample for measurement was measured using an air-comparison pycnometer [Model 1000 manufactured by Tokyoscience Co., Ltd.] according to a method described in ASTM D 2856-87 PROCEDURE C.

On the other hand, an apparent volume va (cm$^3$) of the polyethylene resin foam was measured by sinking the whole polyethylene resin foam sample after the vc measurement in ethanol in a measuring cylinder, and reading a liquid level rising in the measuring cylinder (a submersion method).

An open cell ratio (%) of the foam-molded article was calculated by the following formula:

Open Cell Ratio (%) of Foam-Molded Article=(va−vc)÷va×100

Although the open cell ratio increases with the rise in steam pressure, the maximum molding pressure was defined as the maximum pressure at which the open cell ratio reached 22% or less. There was a tendency in which the in-mold foam-molded article was greatly shrunk when the open cell ratio is more than 20 to 25%.

<Mold-Processing Range>

The difference between the minimum molding pressure and the maximum molding pressure was defined as the mold-processing range.

<Surface Beauty of Foam-Molded Article>

The surface and edges of a foam-molded article molded in a condition of the minimum molding pressure+0.01 MPa among the obtained foam-molded articles to be evaluated were observed, and the evaluation was made according to the following criteria. Here, the edge of the foam-molded article refers to a ridge line section at which the surfaces of the in-mold foam-molded article intersect with one another.

○: Adjacent foamed particles are finely fused to each other at any part, and there are no spaces between the foamed particles.

Δ: There are a few spaces between adjacent foamed particles.

x: There are a lot of spaces between adjacent foamed particles.

<Dimensional Shrinkage Percentage to Mold of Foam-Molded Article>

A longitudinal size (a direction of 400 mm) of foam-molded article molded in a condition of the minimum molding pressure+0.01 MPa among the obtained foam-molded articles to be evaluated was measured using a digital caliper [manufactured by Mitutoyo Corporation].

A dimensional shrinkage percentage to mold was calculated by the following formula in which $L_0$ is a size of a corresponding mold, and $L_1$ is a size of a foam-molded article, and the evaluation was made by the following criteria.

Dimensional Shrinkage Percentage to Mold (%)=($L_0$−$L_1$)÷$L_0$×100

○: A dimensional shrinkage percentage to mold of 3% or less

Δ: A dimensional shrinkage percentage to mold of more than 3% and 4% or less x: A dimensional shrinkage percentage to mold of more than 4%

<Open Cell Ratio of Foam-Molded Article>

From the center of a foam-molded article molded in a condition of the minimum molding pressure or a condition of the minimum molding pressure+0.02 MPa among the obtained in-mold foam-molded articles, a piece having sizes of about 25 mm×25 mm×30 mm was cut down, which were used as a foam sample for measurement.

With respect to the sample, an open cell ratio (%) of the foam-molded article was calculated according to the method described in "<Maximum Molding Pressure on Molding>."

Example 1

[Production of Polyethylene Resin Particles]

As a linear polyethylene resin, 90 parts by weight of the component (A-1) and 10 parts by weight of the component (B-1) were mixed, with which 0.2 parts by weight of glycerol and 0.1 parts by weight of talc as a cell-nucleating agent, based on 100 parts by weight of the total amount of the mixed linear polyethylene resin, were dry-blended.

The dry-blended mixture was thrown into a twin-screw extruder having a bore diameter of 45 mm, melt-kneaded at a resin temperature of about 220° C., and extruded through a circular die equipped on a tip of the extruder into strands, and they were cooled with water and cut with a cutter to obtain polyethylene resin particles. The particles had a weight per particle of 4.5 mg. The evaluation results of the resin pressure upon the production are shown in Table 2.

The measurement results of the storage elastic modulus and MI of the obtained polyethylene resin particles are shown in Table 2.

[Production of Polyethylene Resin Foamed Particles]

<First Stage Foaming>

In a pressure-resistant autoclave having a volume of 10 L were filled 100 parts by weight (2.4 kg) of the obtained polyethylene resin particles, 200 parts by weight of water, 0.5 parts by weight of tribasic calcium phosphate, which was a hardly water-soluble inorganic compound, and 0.03 parts by weight of an sodium alkylsulfonate (sodium n-paraffin-sulfonate), which was a surfactant, and then 7 parts by weight of carbon dioxide gas was added thereto as a foaming agent with stirring.

The temperature of the content in the autoclave was raised to a foaming temperature of 121.6° C. described in Table 2. After that, the carbon dioxide gas was additionally introduced with pressure into the autoclave, to increase the autoclave inner pressure to a foaming pressure of 3.5 MPa-G described in Table 2. After the foaming temperature and the foaming pressure were kept for 30 minutes, a valve located on the lower part of the autoclave was opened to release the content in the autoclave through an open orifice (one hole) having a diameter of 4.0 mm into an atmosphere having a temperature of 100° C., thereby obtaining polyethylene resin foamed particles.

The measurement results of the expansion ratio and the DSC ratio of the obtained first stage foamed particles are shown in table 2.

<Second Stage Foaming>

After moisture was removed from the obtained polyethylene resin first stage foamed particles, the particles were filled in the pressure resistant vessel, and impregnated with air by pressurization, whereby an inner pressure of the first stage foamed particles was adjusted to 0.18 MPa. After that, a second stage foaming was performed by heating the particles with steam (a steam pressure of 0.052 MPa-G), thereby obtaining polyethylene resin second stage foamed particles having an expansion ratio of about 25 times.

The measurement results of the average cell diameter and the open cell ratio of the obtained polyethylene resin second stage foamed particle are shown in Table 2.

[Production of Polyethylene Resin in-Mold Foam-Molded Article]

After moisture was removed from the obtained polyethylene resin second stage foamed particles, they were filled in a mold having a flat plate-like molding space having a length of 400 mm, a width of 300 mm, and a thickness of 60 mm, and the inside of the mold chamber was heated with steam for 10 seconds. After that, an exhaust valve was closed, and the mold was heated with steam for 12 seconds to fuse the foamed particles to each other. Subsequently, after the steam was exhausted and the inside of the mold and the surface of the molded article were cooled with water, the molded article was taken out to obtain a polyethylene resin in-mold foam-molded article.

In the heating step, the pre-determined steam pressure was changed 0.01 MPa by 0.01 MPa within a range of 0.10 to 0.18 MPa (gauge pressure) and molding was performed at each steam pressure. In the heating time of 12 seconds in the heating step, the holding time at the pre-determined pressure was 4 seconds.

Each of the obtained foam-molded article was allowed to stand at 23° C. for 2 hours, and then it was aged at 75° C. for 24 hours, and after that it was allowed to stand in a room having a temperature of 23° C. for 4 hours, whereby a subject to be evaluated was obtained.

After the minimum value of the steam pressure (the minimum molding pressure) at which the fusion ratio reached 80% or more was specified, the dimensional shrinkage percentage to mold and the surface beauty of the foam-molded article, which was molded in a condition of the minimum molding pressure+0.01 MPa were evaluated. In addition, as the evaluation of the open cell ratio, the open cell ratio (L) obtained in the minimum molding pressure and the open cell ratio (H) obtained in the condition of the minimum molding pressure+0.02 MPa were measured. The results are shown in Table 2.

Examples 2 to 8

Polyethylene resin particles, polyethylene resin foamed particles, and a polyethylene resin in-mold foam-molded article were produced in the same manner as in Example 1, except that in [Production of Polyethylene Resin Particle], the kind and the mixing amount of the linear polyethylene resin were changed as shown in Table 2, and in [Production of Polyethylene Resin Foamed particles], the foaming temperature and foaming pressure on the first stage foaming and the inner pressure and steam pressure on the second stage foaming were changed as shown in Table 2.

The evaluation results of the obtained polyethylene resin particles, the polyethylene resin foamed particles, and the polyethylene resin in-mold foam-molded article are shown in Table 2.

Example 9

Polyethylene resin particles, polyethylene resin foamed particles, and a polyethylene resin in-mold foam-molded article were produced in the same manner as in Example 1, except that in [Production of Polyethylene Resin Particles], glycerol was not added, and in [Production of Polyethylene Resin Foamed particles], the foaming temperature and the foaming pressure on the first stage foaming and the inner pressure and the steam pressure on the second stage foaming were changed as shown in Table 2.

The evaluation results of the obtained polyethylene resin particles, the polyethylene resin foamed particles, and the polyethylene resin in-mold foam-molded article are shown in Table 2.

TABLE 2

|  |  |  | | Example 1 | Example 2 | Example 3 | Example 4 | Example 5 |
|---|---|---|---|---|---|---|---|---|
| Resin particles | Linear polyethylene resin (A) | kind | | (A-1) | (A-1) | (A-2) | (A-3) | (A-4) |
|  |  | parts by weight | | 90 | 75 | 90 | 70 | 70 |
|  | Linear polyethylene resin (B) | kind | | (B-1) | (B-1) | (B-1) | (B-1) | (B-1) |
|  |  | parts by weight | | 10 | 25 | 10 | 30 | 30 |
|  | Glycerol | parts by weight | | 0.2 | 0.2 | 0.2 | 0.2 | 0.2 |
|  | Talc | parts by weight | | 0.1 | 0.1 | 0.1 | 0.1 | 0.1 |
|  | Resin pressure | — | | ○ | ○ | ○ | ○ | ○ |
|  | Storage elastic modulus (1 rad/sec) | Pa | | 1452 | 2494 | 1880 | 1890 | 1795 |
|  | Storage elastic modulus (100 rad/sec) | Pa | | 76215 | 86253 | 82423 | 78425 | 68250 |
|  | MI of resin particles | g/10 min | | 1.9 | 1.2 | 1.3 | 1.4 | 1.5 |
| First stage foaming | Foaming temperature | ° C. | | 121.6 | 123.6 | 122.0 | 123.4 | 121.5 |
|  | Foaming pressure | MPa-G | | 3.5 | 3.5 | 3.5 | 3.5 | 3.5 |
|  | Expansion ratio | (times) | | 12.9 | 11.9 | 12.2 | 12.2 | 12.8 |
|  | The number of melting peaks | — | | two peaks | two peaks | two peaks | two peaks | two peaks |
|  | DSC ratio | % | | 24.5 | 14.2 | 17.8 | 15.0 | 14.1 |
| Second stage foaming | Inner pressure | MPa | | 0.18 | 0.27 | 0.19 | 0.25 | 0.24 |
|  | Steam pressure | MPa-G | | 0.052 | 0.054 | 0.056 | 0.057 | 0.050 |
|  | Average cell diameter | μm | | 200 | 210 | 220 | 190 | 200 |
|  | Open cell ratio | % | | 3 | 2 | 2 | 3 | 2 |

TABLE 2-continued

| In-mold foam-molding | | | | | | | |
|---|---|---|---|---|---|---|---|
| | The minimum molding pressure | MPa-G | 0.11 | 0.11 | 0.11 | 0.12 | 0.11 |
| | Surface beauty | — | ○ | ○ | ○ | ○ | ○ |
| | Dimensional shrinkage percentage to mold | — | ○ | ○ | ○ | ○ | ○ |
| | Open cell ratio (L) | % | 13 | 11 | 10 | 16 | 12 |
| | Open cell ratio (H) | % | 17 | 14 | 11 | 17 | 14 |

| | | | Example 6 | Example 7 | Example 8 | Example 9 |
|---|---|---|---|---|---|---|
| Resin particles | Linear polyethylene resin (A) | kind | (A-3) | (A-4) | (A-2) | (A-1) |
| | | parts by weight | 60 | 85 | 80 | 90 |
| | Linear polyethylene resin (B) | kind | (B-1) | (B-1) | (B-2) | (B-1) |
| | | parts by weight | 40 | 15 | 20 | 10 |
| | Glycerol | parts by weight | 0.2 | 0.2 | 0.2 | — |
| | Talc | parts by weight | 0.1 | 0.1 | 0.1 | 0.1 |
| | Resin pressure | — | ○ | ○ | ○ | ○ |
| | Storage elastic modulus (1 rad/sec) | Pa | 2611 | 1215 | 1544 | 1469 |
| | Storage elastic modulus (100 rad/sec) | Pa | 91215 | 65002 | 88232 | 77112 |
| | MI of resin particles | g/10 min | 0.9 | 2.8 | 1.4 | 1.9 |
| First stage foaming | Foaming temperature | °C. | 124.8 | 122.0 | 123.2 | 121.1 |
| | Foaming pressure | MPa-G | 3.5 | 3.5 | 3.5 | 4.5 |
| | Expansion ratio | (times) | 11.8 | 13.6 | 11.8 | 12.4 |
| | The number of melting peaks | — | two peaks | two peaks | two peaks | two peaks |
| | DSC ratio | % | 8.7 | 28.4 | 21.2 | 24.1 |
| Second stage foaming | Inner pressure | MPa | 0.28 | 0.18 | 0.19 | 0.21 |
| | Steam pressure | MPa-G | 0.055 | 0.044 | 0.051 | 0.046 |
| | Average cell diameter | μm | 190 | 200 | 200 | 150 |
| | Open cell ratio | % | 2 | 3 | 2 | 3 |
| In-mold foam-molding | The minimum molding pressure | MPa-G | 0.12 | 0.11 | 0.11 | 0.11 |
| | Surface beauty | — | ○ | ○ | ○ | ○ |
| | Dimensional shrinkage percentage to mold | — | ○ | ○ | ○ | ○ |
| | Open cell ratio (L) | % | 12 | 13 | 12 | 14 |
| | Open cell ratio (H) | % | 15 | 18 | 15 | 19 |

Comparative Examples 1 to 4

Polyethylene resin particles, polyethylene resin foamed particles, and a polyethylene resin in-mold foam-molded article were produced in the same manner as in Example 1, except that in [Production of Polyethylene Resin Particles], the kind and the mixing amount of the linear polyethylene resin were changed as shown in Table 3, and in [Production of Polyethylene Resin Foamed particles], the foaming temperature and the foaming pressure on the first stage foaming, and the inner pressure and the steam pressure on the second stage foaming were changed as shown in Table 3.

The evaluation results of the obtained polyethylene resin particles, polyethylene resin foamed particles, and the polyethylene resin in-mold foam-molded article are shown in Table 3.

Comparative Example 5

Polyethylene resin foamed particles were produced in the same manner as in Example 1 except that in <First stage Foaming> of [Production of Polyethylene Resin Foamed particles], the foaming temperature on the first stage foaming was changed to 130° C. The obtained first stage foamed particles had many wrinkles, which were greatly shrunk beads, and had one melting peak on the DSC curve of the foamed particles.

The <second stage foaming> was performed in the same manner as in [Production of Polyethylene Resin Foamed particles] of Example 1, however, the foamed particles were not foamed, and the foamed particle having a desired expansion ratio could not obtained.

TABLE 3

| | | | Comparative Example 1 | Comparative Example 2 | Comparative Example 3 | Comparative Example 4 | Comparative Example 5 |
|---|---|---|---|---|---|---|---|
| Resin particles | Linear polyethylene resin (A) | kind | (A-2) | (A-3) | (A-7) | (A-2) | (A-1) |
| | | parts by weight | 100 | 95 | 100 | 50 | 90 |
| | Linear polyethylene resin (B) | kind | None | (B-1) | None | (B-1) | (B-1) |
| | | parts by weight | | 5 | | 50 | 10 |
| | Glycerol | parts by weight | 0.2 | 0.2 | 0.2 | 0.2 | 0.2 |
| | Talc | parts by weight | 0.1 | 0.1 | 0.1 | 0.1 | 0.1 |
| | Resin pressure | — | ○ | ○ | x | x | ○ |
| | Storage elastic modulus (1 rad/sec) | Pa | 830 | 418 | 1624 | 5888 | 1452 |
| | Storage elastic modulus (100 rad/sec) | Pa | 70758 | 61534 | 113660 | 130021 | 76215 |
| | MI of resin particles | g/10 min | 2.1 | 3.1 | 1.0 | 0.2 | 1.9 |

TABLE 3-continued

| | | | Comparative Example 1 | Comparative Example 2 | Comparative Example 3 | Comparative Example 4 | Comparative Example 5 |
|---|---|---|---|---|---|---|---|
| First stage foaming | Foaming temperature | °C. | 120.6 | 121.6 | 122.0 | 125.1 | 130.0 |
| | Foaming pressure | MPa-G | 3.5 | 3.5 | 3.5 | 3.5 | 3.5 |
| | Expansion ratio | (times) | 11.8 | 13.8 | 11.9 | 9.8 | 5.2 |
| | The number of melting peaks | | two peaks | two peaks | two peaks | two peaks | one peak |
| | DSC ratio | % | 32.2 | 33.5 | 23.4 | 4.6 | 0 |
| Second stage foaming | Inner pressure | Mpa | 0.25 | 0.20 | 0.30 | 0.34 | Foaming was impossible |
| | Steam pressure | MPa-G | 0.048 | 0.045 | 0.051 | 0.055 | |
| | Average cell diameter | μm | 220 | 230 | 200 | 230 | |
| | Open cell ratio | % | 3 | 4 | 2 | 2 | |
| In-mold foam-molding | The minimum molding pressure | MPa-G | 0.11 | 0.12 | 0.12 | 0.14 | No evaluation |
| | Surface beauty | — | ○ | ○ | ○ | x | |
| | Dimensional shrinkage percentage to mold | — | ○ | Δ | ○ | x | |
| | Open cell ratio (L) | % | 15 | 20 | 9 | 9 | |
| | Open cell ratio (H) | % | 24 | 30 | 13 | 11 | |

As indicated by Examples 1 to 8, when the polyethylene resin foamed particles were used, the obtained molded article has a low open cell ratio of 20% or less, and even if the steam pressure is increased by 0.02 MPa from the minimum molding pressure, the increase of the open cell ratio of the molded article was 5% or less, and the in-mold foam-molded article having the good appearance could be obtained. Even if the molding steam pressure is changed, the good in-mold foam-molded article can be obtained by using the foamed particles, and thus it was possible to improve the production stability and to stabilize the quality. Furthermore, the resin pressure, which is an indicator of the productivity on the resin particle production, was 8.0 MPa or less, and the productivity of the resin particles was good.

From the comparison of Example 1 with Example 9, it is seen that the presence of glycerol, which is the hydrophilic substance, can suppress the foaming pressure.

On the contrary, when the storage elastic modulus at an angular frequency of 1 rad/second was less than 900 Pa, as in Comparative Examples 1 and 2, the increase of the molded article open cell ratio by the increase of heated steam pressure on the in-mold foam-molding was 5% or more, and it is seen that the open cells are easily made.

As in Comparative Example 3, when the storage elastic modulus at an angular frequency of 100 rad/second was more than 100000 Pa, although the good in-mold foam-molded article could be obtained, the resin pressure on the resin particle production was more than 8.0 MPa, and it is seen that the productivity is worsened.

As in Comparative Example 4, when the storage elastic modulus at an angular frequency of 1 rad/second was more than 5000 Pa, although the in-mold foam-molded article having a low open cell ratio could be obtained, the appearance and the dimensional stability were worsened.

As in Comparative Example 5, when there was one peak on the DSC curve of the foamed particles, the obtained foamed particles had many wrinkles and were shrunk because open cells might be made in the obtained foamed particles, and it is seen that even if the second stage foaming was tried to perform, the foamed particle having a desired expansion ratio cannot be obtained.

Example 10

[Production of Polyethylene Resin Particles]

As a polyethylene resin, 80 parts by weight of the component (A-3) and 20 parts by weight of the component (B-1) were mixed, with which 0.2 parts by weight of glycerol and 0.1 parts by weight of talc as a cell-nucleating agent, based on 100 parts by weight of the total amount of the mixed linear polyethylene resin, were dry-blended.

The dry-blended mixture was thrown into a twin-screw extruder having a bore diameter of 45 mm, melt-kneaded at a resin temperature of about 220° C., and extruded through a circular die equipped on a tip of the extruder into strands, and they were cooled with water and cut with a cutter to obtain polyethylene resin particles. The particles had a weight per particle of 4.5 mg.

The measurement results of the storage elastic modulus, the crystal melting heat q, and MI of the obtained polyethylene resin particles are shown in Table 4.

[Production of Polyethylene Resin Foamed Particles]

<First Stage Foaming>

In a pressure-resistant autoclave having a volume of 10 L were filled 100 parts by weight (2.4 kg) of the obtained polyethylene resin particles, 200 parts by weight of water, 0.5 parts by weight of tribasic calcium phosphate, which was a hardly water-soluble inorganic compound, and 0.03 parts by weight of an sodium alkylsulfonate (sodium n-paraffin-sulfonate), which was a surfactant, and then 7 parts by weight of carbon dioxide gas was added thereto as a foaming agent with stirring.

The temperature of the content in the autoclave was raised to a foaming temperature of 122.4° C. described in Table 4. After that, the carbon dioxide gas was additionally introduced with pressure into the autoclave, to increase the autoclave inner pressure to a foaming pressure of 3.5 MPa-G described in Table 4. After the foaming temperature and the foaming pressure were kept for 30 minutes, a valve located on the lower part of the autoclave was opened to release the content in the autoclave through an open orifice (one hole) having a diameter of 4.0 mm into an atmosphere having a temperature of 100° C., thereby obtaining polyethylene resin foamed particles.

The measurement results of the expansion ratio, the melting peak temperature difference, and the DSC ratio of the obtained first stage foamed particles are shown in table 4.

<Second Stage Foaming>

After moisture was removed from the obtained polyethylene resin first stage foamed particles, the particles were filled in the pressure resistant vessel and impregnated with air by pressurization, whereby an inner pressure of the first stage foamed particles was adjusted to 0.20 MPa. After that, a second stage foaming was performed by heating the particles with steam (a steam pressure of 0.053 MPa-G), thereby obtaining polyethylene resin second stage foamed particles having an expansion ratio of about 25 times.

The average cell diameter and the open cell ratio of the obtained polyethylene resin second stage foamed particles were measured. The results are shown in Table 4.

[Production of Polyethylene Resin in-Mold Foam-Molded Article]

After moisture was removed from the obtained polyethylene resin second stage foamed particles, they were filled in a mold having a flat plate-like molding space having a length of 400 mm, a width of 300 mm, and a thickness of 60 mm, and the inside of the mold chamber was heated with steam for 10 seconds. After that, an exhaust valve was closed, and the mold was heated with steam for 12 seconds to fuse the foamed particles to each other. Subsequently, after the steam was exhausted and the inside of the mold and the surface of the molded article were cooled with water, the molded article was taken out to obtain a polyethylene resin in-mold foam-molded article.

In the heating step, the pre-determined steam pressure was changed 0.01 MPa by 0.01 MPa within a range of 0.10 to 0.18 MPa (gauge pressure) and molding was performed at each steam pressure. In the heating time of 12 seconds in the heating step, the holding time at the pre-determined pressure was 4 seconds.

Each of the obtained foam-molded article was allowed to stand at 23° C. for 2 hours, and then it was aged at 75° C. for 24 hours, and after that it was allowed to stand in a room having a temperature of 23° C. for 4 hours, whereby a subject to be evaluated was obtained.

After the minimum value of the steam pressure (the minimum molding pressure) at which the fusion ratio reached 80% or more was specified, the dimensional shrinkage percentage to mold and the surface beauty of the foam-molded article, which was molded in a condition of the minimum molding pressure+0.01 MPa were evaluated. In addition, the evaluation of the open cell ratio of the obtained in-mold foam-molded article was measured, and the maximum molding pressure was specified. The results are shown in Table 4.

Examples 11 to 16

Polyethylene resin particles, polyethylene resin foamed particles, and a polyethylene resin in-mold foam-molded article were produced in the same manner as in Example 10, except that in [Production of Polyethylene Resin Particles], the kind and mixing amount of the polyethylene resin were changed as shown in Table 4, and in [Production of Polyethylene Resin Foamed particles], the foaming temperature and the foaming pressure on the first stage foaming and the inner pressure and the steam pressure on the second stage foaming were changed as shown in Table 4.

The evaluation results of the obtained polyethylene resin particles, the polyethylene resin foamed particles, and the polyethylene resin in-mold foam-molded article are shown in Table 4.

TABLE 4

| | | | Example 10 | Example 11 | Example 12 | Example 13 | Example 14 | Example 15 | Example 16 |
|---|---|---|---|---|---|---|---|---|---|
| Resin particles | Polyethylene resin (A) | kind | (A-3) | (A-3) | (A-3) | (A-5) | (A-6) | (A-3) | (A-3) |
| | | parts by weight | 80 | 70 | 60 | 90 | 95 | 70 | 80 |
| | Polyethylene resin (B) | kind | (B-1) | (B-1) | (B-1) | (B-1) | (B-1) | (B-2) | (B-1) |
| | | parts by weight | 20 | 30 | 40 | 10 | 5 | 30 | 20 |
| | Glycerol | parts by weight | 0.2 | 0.2 | 0.2 | 0.2 | 0.2 | 0.2 | — |
| | Talc | parts by weight | 0.1 | 0.1 | 0.1 | 0.1 | 0.1 | 0.1 | 0.1 |
| | Resin pressure | | — | ○ | ○ | ○ | ○ | ○ | ○ | ○ |
| | Storage elastic modulus (1 rad/sec) | Pa | 1258 | 1890 | 2611 | 1580 | 1177 | 1230 | 1269 |
| | Storage elastic modulus (100 rad/sec) | Pa | 70064 | 78425 | 91215 | 80577 | 74920 | 69810 | 70558 |
| | Crystal melting heat of resin particles | J/g | 156 | 162 | 165 | 161 | 149 | 163 | 157 |
| | MI of resin particles | g/10 min | 2.1 | 1.4 | 0.9 | 1.8 | 1.8 | 2.0 | 2.1 |
| First stage foaming | Foaming temperature | ° C. | 122.4 | 123.4 | 123.8 | 124.4 | 122.0 | 123.6 | 122.0 |
| | Foaming pressure | MPa-G | 3.5 | 3.5 | 3.5 | 3.5 | 3.5 | 3.5 | 4.5 |
| | Expansion ratio | (times) | 13.1 | 12.2 | 11.8 | 12.8 | 12.6 | 11.1 | 13.0 |
| | Melting peak temperature difference | ° C. | 7.4 | 6.7 | 5.9 | 6.6 | 8.8 | 6.0 | 7.2 |
| | DSC ratio | % | 21.0 | 15.0 | 8.7 | 18.6 | 23.6 | 22.2 | 20.1 |
| Second stage foaming | Inner pressure | MPa | 0.20 | 0.25 | 0.28 | 0.25 | 0.22 | 0.26 | 0.18 |
| | Steam pressure | MPa-G | 0.053 | 0.057 | 0.055 | 0.052 | 0.046 | 0.062 | 0.050 |
| | Average cell diameter | μm | 200 | 190 | 190 | 190 | 180 | 170 | 160 |
| | Open cell ratio | % | 3 | 3 | 2 | 2 | 3 | 3 | 3 |
| In-mold foam-molding | Surface beauty | — | ○ | ○ | ○ | ○ | ○ | ○ | ○ |
| | Dimensional shrinkage percentage to mold | — | ○ | ○ | ○ | ○ | ○ | ○ | ○ |
| | The minimum molding pressure | MPa | 0.11 | 0.12 | 0.13 | 0.12 | 0.12 | 0.13 | 0.11 |
| | The maximum molding pressure | MPa | 0.13 | 0.15 | 0.16 | 0.15 | 0.14 | 0.15 | 0.13 |
| | Mold-processing range | MPa | 0.02 | 0.03 | 0.03 | 0.03 | 0.02 | 0.02 | 0.02 |

Comparative Examples 6 to 9

Polyethylene resin particles, polyethylene resin foamed particles, and a polyethylene resin in-mold foam-molded article were produced in the same manner as in Example 10, except that in [Production of Polyethylene Resin Particles], the kind and the mixing amount of the polyethylene resin were changed as shown in Table 5, and in [Production of Polyethylene Resin Foamed particles], the foaming temperature and the foaming pressure on the first stage foaming, and the inner pressure and the steam pressure on the second stage foaming were changed as shown in Table 5.

The evaluation results of the obtained polyethylene resin particles, polyethylene resin foamed particles, and the polyethylene resin in-mold foam-molded article are shown in Table 5.

TABLE 5

|  |  |  | Comparative Example 6 | Comparative Example 7 | Comparative Example 8 | Comparative Example 9 |
|---|---|---|---|---|---|---|
| Resin particles | Polyethylene resin (A) | kind | (A-5) | (A-3) | (A-3) | (A-8) |
|  |  | parts by weight | 100 | 95 | 50 | 100 |
|  | Polyethylene resin (B) | kind | None | (B-1) | (B-1) | None |
|  |  | parts by weight |  | 5 | 50 |  |
|  | Glycerol | parts by weight | 0.2 | 0.2 | 0.2 | 0.2 |
|  | Talc | parts by weight | 0.1 | 0.1 | 0.1 | 0.1 |
|  | Resin pressure |  | — | ○ | ○ | x | x |
|  | Storage elastic modulus (1 rad/sec) | Pa | 551 | 418 | 4850 | 1555 |
|  | Storage elastic modulus (100 rad/sec) | Pa | 68101 | 61534 | 100947 | 110989 |
|  | Crystal melting heat of resin particles | J/g | 158 | 150 | 171 | 149 |
|  | MI of resin particles | g/10 min | 2.5 | 3.1 | 0.5 | 1.0 |
| First stage foaming | Foaming temperature | °C. | 122.1 | 121.6 | 123.9 | 122.6 |
|  | Foaming pressure | MPa-G | 3.5 | 3.5 | 3.5 | 3.5 |
|  | Expansion ratio | (times) | 13.0 | 13.8 | 10.5 | 12.4 |
|  | Melting peak temperature difference | °C. | 7.2 | 8.4 | 4.8 | 8.6 |
|  | DSC ratio | % | 34.2 | 33.5 | 8.3 | 21.6 |
| Second stage foaming | Inner pressure | MPa | 0.21 | 0.20 | 0.44 | 0.29 |
|  | Steam pressure | MPa-G | 0.060 | 0.045 | 0.068 | 0.055 |
|  | Average cell diameter | μm | 210 | 230 | 190 | 200 |
|  | Open cell ratio | % | 3 | 4 | 2 | 2 |
| In-mold foam-molding | Surface beauty | — | Δ | ○ | Δ | ○ |
|  | Dimensional shrinkage percentage to mold | — | x | Δ | ○ | ○ |
|  | The minimum molding pressure | MPa | 0.13 | 0.12 | 0.14 | 0.11 |
|  | The maximum molding pressure | MPa | 0.13 | 0.12 | 0.16 | 0.14 |
|  | Mold-processing range | MPa | 0.00 | 0.00 | 0.02 | 0.03 |

As indicated by Examples 10 to 16, in the polyethylene resin foamed particles, the resin pressure was 8.0 MPa or less on the resin particle production. In addition, the in-mold foam-molded articles having the good appearance in a broad mold-processing range were obtained, in spite of a narrow melting peak temperature difference of the foamed particles of 11° C. or lower.

When the foamed particles are used, even if the polyethylene resin foamed particles having a narrow melting peak temperature difference, such as polyethylene resins having a high degree of crystallinity, are used, the productivity is good, and the moldability in the in-mold foam-molding is good.

On the contrary, it is seen that when the storage elastic modulus at an angular frequency of 1 rad/second was less than 900 Pa as in Comparative Examples 6 and 7, the mold-processing range is narrow, i.e., 0.01 MPa or less, and the dimensional shrinkage percentage is large.

When the storage elastic modulus at an angular frequency of 100 rad/second was more than 100000 Pa as in Comparative Examples 8 and 9, although the mold-processing range was 0.02 MPa or more, the resin pressure is more than 8.0 MPa on the resin particle production, and it is seen that the productivity is worsened.

Example 17

[Production of Polyethylene Resin Particles]

As (A) linear low-density polyethylene resin, 95 parts by weight of the component (A-2) and as (B) high-density polyethylene resin, 5 parts by weight of the component (B-1) were mixed, with which 0.2 parts by weight of glycerol and 0.1 parts by weight of talc as a cell-nucleating agent, based on 100 parts by weight of the total amount of the mixed polyethylene resin, were dry-blended.

The dry-blended mixture was thrown into a twin-screw extruder having a bore diameter of 45 mm, melt-kneaded at a resin temperature of about 220° C., and extruded through a circular die equipped on a tip of the extruder into strands, and they were cooled with water and cut with a cutter to obtain polyethylene resin particles. The particles had a weight per particle of 4.5 mg.

[Production of Polyethylene Resin Foamed Particles]

<First Stage Foaming>

In a pressure-resistant autoclave having a volume of 10 L were filled 100 parts by weight (2.4 kg) of the obtained polyethylene resin particles, 200 parts by weight of water, 0.5 parts by weight of tribasic calcium phosphate, which was a hardly water-soluble inorganic compound, and 0.03 parts by weight of an sodium alkylsulfonate (sodium n-paraffinsulfonate), which was a surfactant, and then 7 parts by weight of carbon dioxide gas was added thereto as a foaming agent with stirring.

The temperature of the content in the autoclave was raised to a foaming temperature of 121.8° C. described in Table 6. After that, the carbon dioxide gas was additionally introduced with pressure into the autoclave, to increase the autoclave inner pressure to a foaming pressure of 3.5 MPa-G described in Table 6. After the foaming temperature and the foaming pressure were kept for 30 minutes, a valve located on the lower part of the autoclave was opened to release the content in the autoclave through an open orifice (one hole) having a diameter of 4.0 mm into an atmosphere having a temperature of 100° C., thereby obtaining polyethylene resin foamed particles.

With respect to the obtained first stage foamed particles, the expansion ratio and the DSC ratio were measured, and the shrinkage state was observed. The results are shown in Table 6.

<Second Stage Foaming>

After moisture was removed from the obtained polyethylene resin first stage foamed particles, the particles were filled in the pressure resistant vessel and impregnated with air by pressurization, whereby an inner pressure of the first stage foamed particles was adjusted to 0.20 MPa. After that, a second stage foaming was performed by heating the particles with steam (a steam pressure of 0.048 MPa-G), thereby obtaining polyethylene resin second stage foamed particles having an expansion ratio of about 25 times.

The average cell diameter and the open cell ratio of the obtained polyethylene resin second stage foamed particles were measured. The results are shown in Table 6.

[Production of Polyethylene Resin in-Mold Foam-Molded Article]

After moisture was removed from the obtained polyethylene resin second stage foamed particles, they were filled in a mold having a molding space having a length of 400 mm, a width of 300 mm, and a thickness of 60 mm, and the inside of the mold chamber was heated with steam for 10 seconds. After that, an exhaust valve was closed, and the mold was heated with steam for 12 seconds to fuse the foamed particles to each other. Subsequently, after the steam was exhausted and the inside of the mold and the surface of the molded article were cooled with water, the molded article was taken out to obtain a polyethylene resin in-mold foam-molded article.

In the heating step, the pre-determined steam pressure was changed 0.01 MPa by 0.01 MPa within a range of 0.10 to 0.18 MPa (gauge pressure) and molding was performed at each steam pressure. In the heating time of 12 seconds in the heating step, the holding time at the pre-determined pressure was 4 seconds.

Each of the obtained foam-molded article was allowed to stand at 23° C. for 2 hours, and then it was aged at 75° C. for 24 hours, and after that it was allowed to stand in a room having a temperature of 23° C. for 4 hours, whereby a subject to be evaluated was obtained.

After the minimum value of the steam pressure (the minimum molding pressure) at which the fusion ratio reached 80% or more was specified, the dimensional shrinkage percentage to mold and the surface beauty of the foam-molded article, which was molded in a condition of the minimum molding pressure+0.01 MPa were evaluated. In addition, as the evaluation of the open cell ratio, the open cell ratio (L) obtained in the minimum molding pressure and the open cell ratio (H) obtained in the condition of the minimum molding pressure+0.02 MPa were measured. The results are shown in Table 6.

Examples 18 to 23

Polyethylene resin particles, polyethylene resin foamed particles, and a polyethylene resin in-mold foam-molded article were produced in the same manner as in Example 17, except that in [Production of Polyethylene Resin Particles], the kinds and the mixing amounts of the (A) linear low-density polyethylene resin and the (B) high-density polyethylene resin were changed as shown in Table 6, and in [Production of Polyethylene Resin Foamed particles], the foaming temperature on the first stage foaming and the inner pressure and the steam pressure on the second stage foaming were changed as shown in Table 6.

The evaluation results of the obtained polyethylene resin particles, the polyethylene resin foamed particles, and the polyethylene resin in-mold foam-molded article are shown in Table 6.

TABLE 6

| | | | Example 17 | Example 18 | Example 19 | Example 20 | Example 21 | Example 22 | Example 23 |
|---|---|---|---|---|---|---|---|---|---|
| Resin particles | (A) Linear low-density polyethylene resin | kind | (A-2) | (A-2) | (A-2) | (A-3) | (A-3) | (A-4) | (A-2) |
| | | parts by weight | 95 | 90 | 80 | 85 | 70 | 70 | 80 |
| | (B) High-density polyethylene resin | kind | (B-1) | (B-1) | (B-1) | (B-1) | (B-1) | (B-1) | (B-2) |
| | | parts by weight | 5 | 10 | 20 | 15 | 30 | 30 | 20 |
| | Glycerol | parts by weight | 0.2 | 0.2 | 0.2 | 0.2 | 0.2 | 0.2 | 0.2 |
| | Talc | parts by weight | 0.1 | 0.1 | 0.1 | 0.1 | 0.1 | 0.1 | 0.1 |
| | MI of resin particles | g/10 min | 1.6 | 1.3 | 0.9 | 2.6 | 1.4 | 1.9 | 1.4 |
| First stage foaming | Foaming temperature | ° C. | 121.8 | 122.1 | 123.0 | 122.4 | 123.4 | 121.5 | 123.2 |
| | Foaming pressure | MPa-G | 3.5 | 3.5 | 3.5 | 3.5 | 3.5 | 3.5 | 3.5 |
| | Expansion ratio | (times) | 11.6 | 12.4 | 12.0 | 11.3 | 12.1 | 11.8 | |
| | The number of melting peaks | — | two peaks | two peaks | two peaks | two peaks | two peaks | two peaks | two peaks |
| | DSC ratio | % | 26.1 | 16.2 | 10.5 | 24.7 | 14.2 | 17.2 | 21.2 |
| | Ratio of DSC ratio/(A) | — | 0.27 | 0.18 | 0.13 | 0.31 | 0.20 | 0.25 | 0.27 |
| | Shrinkage | — | ◯ | ◯ | ◯ | ◯ | ◯ | ◯ | ◯ |
| Second stage foaming | Inner pressure | MPa | 0.20 | 0.17 | 0.22 | 0.25 | 0.26 | 0.21 | 0.19 |
| | Steam pressure | MPa-G | 0.048 | 0.058 | 0.059 | 0.053 | 0.054 | 0.051 | 0.051 |
| | Average cell diameter | μm | 220 | 210 | 220 | 210 | 190 | 230 | 200 |
| | Open cell ratio | % | 3 | 2 | 2 | 4 | 3 | 3 | 2 |
| In-mold foam-molding | The minimum molding pressure | MPa-G | 0.11 | 0.11 | 0.12 | 0.11 | 0.12 | 0.12 | 0.11 |
| | Surface beauty | — | ◯ | ◯ | ◯ | ◯ | ◯ | ◯ | ◯ |
| | Dimensional shrinkage percentage to mold | — | ◯ | ◯ | ◯ | ◯ | ◯ | ◯ | ◯ |
| | Open cell ratio (L) | % | 14 | 11 | 10 | 16 | 16 | 17 | 12 |
| | Open cell ratio (H) | % | 18 | 12 | 12 | 20 | 17 | 19 | 15 |

Comparative Examples 10 to 20

Polyethylene resin particles, polyethylene resin foamed particles, and a polyethylene resin in-mold foam-molded article were produced in the same manner as in Example 17, except that in [Production of Polyethylene Resin Particles], the kinds and the mixing amounts of the (A) linear low-density polyethylene resin and the (B) high-density polyethylene resin were changed as shown in Table 7, and in [Production of Polyethylene Resin Foamed particles], the foaming temperature and the foaming pressure on the first stage foaming and the inner pressure and the steam pressure on the second stage foaming were changed as shown in Table 7. However, the foamed particles which were greatly shrunk on the first stage foaming were evaluated as the good foamed particles could not be obtained, and the following evaluations were not performed.

The evaluation results of the obtained polyethylene resin particles, the polyethylene resin foamed particles, and the polyethylene resin in-mold foam-molded article are shown in Table 7.

In the first stage foamed particles in Comparative Examples 17 and 18, only one melting peak appeared on the DSC curves.

TABLE 7

| | | | Comparative Example 10 | Comparative Example 11 | Comparative Example 12 | Comparative Example 13 | Comparative Example 14 | Comparative Example 15 |
|---|---|---|---|---|---|---|---|---|
| Resin particles | (A) Linear low-density polyethylene resin | kind | (A-2) | (A-3) | (A-7) | (A-3) | (A-4) | (A-2) |
| | | parts by weight | 100 | 100 | 90 | 50 | 40 | 50 |
| | (B) High-density polyethylene resin | kind | None | None | (B-1) | (B-1) | (B-1) | (B-1) |
| | | parts by weight | | | 10 | 50 | 60 | 50 |
| | Glycerol | parts by weight | 0.2 | 0.2 | 0.2 | 0.2 | 0.2 | 0.2 |
| | Talc | parts by weight | 0.1 | 0.1 | 0.1 | 0.1 | 0.1 | 0.1 |
| | MI | g/10 min | 2.1 | 4.0 | 0.7 | 0.5 | 0.5 | 0.2 |
| First stage foaming | Foaming temperature | °C. | 120.6 | 121.0 | 123.1 | 123.9 | 123.8 | 124.3 |
| | Foaming pressure | MPa-G | 3.5 | 3.5 | 3.5 | 3.5 | 4.0 | 4.0 |
| | Expansion ratio | (times) | 11.6 | 12.9 | 10.3 | 10.5 | 11.3 | 9.8 |
| | The number of melting peaks | — | two peaks | two peaks | two peaks | two peaks | two peaks | two peaks |
| | DSC ratio | % | 31.8 | 36.5 | 13.1 | 8.3 | 5.2 | 7.0 |
| | Ratio of DSC ratio/(A) | — | 0.32 | 0.37 | 0.15 | 0.17 | 0.13 | 0.14 |
| | Shrinkage | — | ○ | Δ | ○ | ○ | ○ | ○ |
| Second stage foaming | Inner pressure | MPa | 0.25 | 0.15 | 0.40 | 0.44 | 0.45 | 0.55 |
| | Steam pressure | MPa-G | 0.045 | 0.043 | 0.060 | 0.068 | 0.063 | 0.065 |
| | Average cell diameter | μm | 220 | 240 | 240 | 190 | 180 | 170 |
| | Open cell ratio | % | 3 | 16 | 1 | 2 | 2 | 1 |
| In-mold foam-molding | The minimum molding pressure | MPa-G | 0.11 | 0.10 | 0.12 | 0.14 | 0.15 | 0.16 |
| | Surface beauty | — | ○ | x | ○ | Δ | x | x |
| | Dimensional shrinkage percentage to mold | — | ○ | x | Δ | ○ | Δ | x |
| | Open cell ratio (L) | % | 14 | 25 | 10 | 17 | 16 | 15 |
| | Open cell ratio (H) | % | 24 | 36 | 11 | 17 | 17 | 19 |

| | | | Comparative Example 16 | Comparative Example 17 | Comparative Example 18 | Comparative Example 19 | Comparative Example 20 |
|---|---|---|---|---|---|---|---|
| Resin particles | (A) Linear low-density polyethylene resin | kind | (A-4) | (A-2) | (A-3) | (A-2) | (A-2) |
| | | parts by weight | 95 | 50 | 50 | 90 | 90 |
| | (B) High-density polyethylene resin | kind | (B-1) | (B-1) | (B-1) | (B-1) | (B-1) |
| | | parts by weight | 5 | 50 | 50 | 10 | 10 |
| | Glycerol | parts by weight | 0.2 | 0.2 | 0.2 | 0.2 | 0.2 |
| | Talc | parts by weight | 0.1 | 0.1 | 0.1 | 0.1 | 0.1 |
| | MI | g/10 min | 5.3 | 0.2 | 0.5 | 1.3 | 1.3 |
| First stage foaming | Foaming temperature | °C. | 120.6 | 132.0 | 132.0 | 123.2 | 120.5 |
| | Foaming pressure | MPa-G | 3.5 | 3.5 | 3.5 | 3.0 | 4.0 |
| | Expansion ratio | (times) | 11.4 | 8.6 | 9.2 | 14.8 | 5.6 |
| | The number of melting peaks | — | two peaks | one peak | one peak | two peaks | two peaks |
| | DSC ratio | % | 39.3 | — | — | 3.5 | 38.9 |
| | Ratio of DSC ratio/(A) | — | 0.41 | — | — | 0.04 | 0.43 |
| | Shrinkage | — | x | x | x | Δ | ○ |
| Second stage foaming | Inner pressure | MPa | The first stage foamed particles were greatly shrunk and had poor quality, and thus the evaluations were not performed. | | | 0.13 | 0.58 |
| | Steam pressure | MPa-G | | | | 0.038 | 0.067 |
| | Average cell diameter | μm | | | | 260 | 160 |
| | Open cell ratio | % | | | | 5 | 2 |
| In-mold foam-molding | The minimum molding pressure | MPa-G | | | | 0.08 | 0.16 |
| | Surface beauty | — | | | | Δ | x |
| | Dimensional shrinkage percentage to mold | — | | | | x | x |
| | Open cell ratio (L) | % | | | | 18 | 13 |
| | Open cell ratio (H) | % | | | | 30 | 18 |

As indicated by Examples 17 to 23, when the polyethylene resin foamed particles were used, the obtained molded article had a low open cell ratio of 20% or less, and even if the steam pressure was increased by 0.02 MPa from the minimum molding pressure, the increase of the open cell ratio in the molded article was 5% or less, and the in-mold foam-molded article having the good appearance was obtained. When the foamed particles are used, even if the molding steam pressure is changed, the good in-mold foam-molded article can be obtained, and thus the production stability can be improved and the quality can be stabilized.

On the contrary, when the high-density polyethylene resin was not blended as in Comparative Examples 10 and 11, the increase of the molded article open cell ratio due to the increase of the heating steam pressure on the in-mold foam-molding was 10% or more, and it is seen that open cells are easily made.

As in Comparative Examples 12 to 16, when the mixing ratio (A)/(B) of the both polyethylene resins and MI of the mixed polyethylene resin did not satisfy the ranges defined herein, even though there were two peaks on the DSC curve of the first stage foamed particles, it is seen that the foamed particles which are not shrunk cannot be produced or, in the in-mold foam-molded article, the dimensional precision is poor or the appearance is inferior. In particular, Patent Document 3 shows that there is a tendency in which the higher the mixing ratio of the (B) high-density polyethylene resin is, the more the moldability improves (comparison of Examples 3 and 4 in Patent Document 3). However, as indicated by comparison of Example 22 with Comparative Example 14, the lower the mixing ratio of the high-density polyethylene resin is, the more the moldability improves (the dimensional shrinkage percentage and the surface beauty).

As in Comparative Examples 17 and 18, when the foaming temperature was adjusted on the first stage foaming (in conditions similar to those in Example 4 of Patent Document 3) and the foamed particles were produced so that only one melting peak appeared on the DSC curve, the obtained first stage foamed particles were greatly shrunk. There are some cases in which it is difficult to obtain the good foamed particles only according to Patent Document 3, depending on the foaming conditions.

As in Comparative Examples 19 and 20, when the ratio (%) of the quantity of heat of the melting peak on a high temperature side to the total quantity of heat of melting peaks on the DSC curve was not 0.05 times or more and 0.4 times or less of the mixing ratio (%) of the (A) linear low-density polyethylene resin in the base resin, the open cell ratio was low, and the in-mold foam-molded article having the good surface beauty and dimensional stability could not be obtained.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

The invention claimed is:

1. Polyethylene resin foamed particles, obtained by foaming polyethylene resin particles comprising a base resin,
   wherein the base resin is a mixed resin of (A), a linear polyethylene resin having a density of 0.915 g/cm$^3$ or more and less than 0.940 g/cm$^3$ in an amount of 60% by weight or more and 97% by weight or less, and (B), a linear polyethylene resin having a density of 0.940 g/cm$^3$ or more in an amount of 3% by weight or more and 40% by weight or less, the total of (A) and (B) being 100% by weight,
   wherein the polyethylene resin particles have a storage elastic modulus of 900 Pa or more and 5000 Pa or less at an angular frequency of 1 rad/second and a storage elastic modulus of 100000 Pa or less at an angular frequency of 100 rad/second, in a dynamic viscoelasticity measurement at 190° C., and
   wherein a differential scanning calorimetry (DSC) curve obtained by heating the polyethylene resin foamed particles using a differential scanning calorimeter at a temperature rising speed of 10° C./minute within a range of 20° C. to 220° C. has two melting peaks with one of the melting peaks on a low temperature side and one of the melting peaks on a high temperature side.

2. The polyethylene resin foamed particles according to claim 1, wherein the linear polyethylene resin (A) has a melt index of 1.2 g/10 minutes or more and 10 g/10 minutes or less, and the linear polyethylene resin (B) has a melt index of 0.01 g/10 minutes or more and 0.3 g/10 minutes or less, and the polyethylene resin particles have a melt index of 0.8 g/10 minutes or more and 3.0 g/10 minutes or less.

3. Polyethylene resin foamed particles,
   obtained by foaming polyethylene resin particles having a storage elastic modulus of 900 Pa or more and 5000 Pa or less at an angular frequency of 1 rad/second and a storage elastic modulus of 100000 Pa or less at an angular frequency of 100 rad/second, in a dynamic viscoelasticity measurement at 190° C.,
   wherein a differential scanning calorimetry (DSC) curve obtained by heating the polyethylene resin foamed particles using a differential scanning calorimeter at a temperature rising speed of 10° C./minute within a range of 20° C. to 220° C. has two melting peaks with one of the melting peaks on a low temperature side and one of the melting peaks on a high temperature side, a difference between respective temperatures at the two melting peaks being 11° C. or lower,
   wherein the polyethylene resin particles comprise a base resin that is a mixed resin of (A'), a linear polyethylene resin having a density of 0.915 g/cm$^3$ or more and less than 0.940 g/cm$^3$ in an amount of 60% by weight or more and 97% by weight or less, and (B'), a linear polyethylene resin having a density of 0.940 g/cm$^3$ or more in an amount of 3% by weight or more and 40% by weight or less, the total of (A') and (B') being 100% by weight.

4. The polyethylene resin foamed particles according to claim 3, wherein, when the polyethylene resin particles are heated at a temperature rising speed of 10° C./minute from 20° C. to 220° C. using the differential scanning calorimeter, cooled to 10° C. at a speed of 10° C./minute, and heated again at a temperature rising speed of 10° C./minute up to 220° C., the polyethylene resin particles have a crystal melting heat q of 145 J/g or more, the crystal melting heat q being calculated from a DSC curve obtained during the second temperature rising.

5. The polyethylene resin foamed particles according to claim 3, wherein the polyethylene resin (A') has a melt index of 1.2 g/10 minutes or more and 10 g/10 minutes or less, and the polyethylene resin has a melt index of 0.01 g/10 minutes or more and 0.3 g/10 minutes or less, and the polyethylene resin particles have a melt index of 0.8 g/10 minutes or more and 3.0 g/10 minutes or less.

6. Polyethylene resin foamed particles comprising a base resin, wherein the base resin is a polyethylene resin that is a resin mixture of:

(A") a linear low-density polyethylene resin having a density of 0.915 g/cm$^3$ or more and less than 0.940 g/cm$^3$ and a melt index of 1.0 g/10 minutes or more and 10 g/10 minutes or less in a content of 50% by weight or more and 97% by weight or less, and (B") a high-density polyethylene resin having a density of 0.940 g/cm$^3$ or more and a melt index of 0.01 g/10 minutes or more and 0.3 g/10 minutes or less in a content of 3% by weight or more and 50% by weight or less, the total of (A") and (B") being 100% by weight, wherein a melt index of the resin mixture is 0.8 g/10 minutes or more and 3.0 g/10 minutes or less, wherein a DSC curve obtained by heating the polyethylene resin foamed particles using a differential scanning calorimeter has two melting peaks with one of the melting peaks on a low temperature side and one of the melting peaks on a high temperature side, and wherein a ratio (%) of a quantity of heat of the melting peak on a high temperature side to a total quantity of heat of the melting peaks on the DSC curve is 0.05 times or more and 0.4 times or less of a ratio (%) of the (A") linear low-density polyethylene resin mixed in the base resin.

7. The polyethylene resin foamed particles according to claim 1, wherein the polyethylene resin foamed particles comprise a hydrophilic compound in an amount of 0.01 parts by weight or more and 10 parts by weight or less based on 100 parts by weight of the base resin of the polyethylene resin particles.

8. The polyethylene resin foamed particles according to claim 1, wherein the polyethylene resin foamed particles have an open cell ratio of 10% or less.

9. A polyethylene resin in-mold foam-molded article obtained by filling the polyethylene resin foamed particles according to claim 1 in a mold, and then in-mold foam-molding the polyethylene resin foamed particles.

10. A method for producing the polyethylene resin foamed particles according to claim 1, comprising:
dispersing the polyethylene resin particles in an aqueous dispersion medium together with a foaming agent;
heating the polyethylene resin particles to a temperature equal to or higher than a softening temperature of the polyethylene resin particles and pressurizing the polyethylene resin particles in a sealed vessel; and
releasing the polyethylene resin particles to an area having a pressure lower than an inner pressure of the sealed vessel.

11. The method according to claim 10, wherein the foaming agent is an inorganic gas and/or water.

12. The method according to claim 11, wherein the inorganic gas is carbon dioxide gas.

13. A method for producing a polyethylene resin in-mold foam-molded article, comprising:
filling the polyethylene resin foamed particles according to claim 1 in a molding space without performing a pre-treatment, wherein the molding space is formed by two molds and capable of being closed but incapable of being sealed; and
heating the polyethylene resin foamed particles by a heating medium.

14. A method for producing the polyethylene resin foamed particles according to claim 3, comprising:
dispersing the polyethylene resin particles in an aqueous dispersion medium together with a foaming agent;
heating the polyethylene resin particles to a temperature equal to or higher than a softening temperature of the polyethylene resin particles and pressurizing the polyethylene resin particles in a sealed vessel; and
releasing the polyethylene resin particles to an area having a pressure lower than an inner pressure of the sealed vessel.

15. The method according to claim 14, wherein the foaming agent is an inorganic gas and/or water.

16. The method according to claim 15, wherein the inorganic gas is carbon dioxide gas.

17. A method for producing the polyethylene resin foamed particles according to claim 6, comprising:
dispersing polyethylene resin particles in an aqueous dispersion medium together with a foaming agent;
heating the polyethylene resin particles to a temperature equal to or higher than a softening temperature of the polyethylene resin particles and pressurizing the polyethylene resin particles in a sealed vessel; and
releasing the polyethylene resin particles to an area having a pressure lower than an inner pressure of the sealed vessel.

18. The method according to claim 17, wherein the foaming agent is an inorganic gas and/or water.

19. The method according to claim 18, wherein the inorganic gas is carbon dioxide gas.

* * * * *